(12) United States Patent
Siew et al.

(10) Patent No.: US 12,345,642 B2
(45) Date of Patent: Jul. 1, 2025

(54) OPTICAL SYSTEM, AND METHOD OF ILLUMINATING A SAMPLE PLANE

(71) Applicants: ADVANCED INSTRUMENT PTE. LTD., Singapore (SG); COMBINATI INCORPORATED, Palo Alto, CA (US)

(72) Inventors: Ronian Siew, Vancouver (CA); Sheau Yeng Wei, Singapore (SG); Ju-Sung Hung, Palo Alto, CA (US)

(73) Assignees: Advanced Instrument Pte. Ltd., Singapore (CN); Combinati Incorporated, Palo Alto, CA (US)

( * ) Notice: Subject to any disclaimer, the term of this patent is extended or adjusted under 35 U.S.C. 154(b) by 0 days.

(21) Appl. No.: 18/160,718

(22) Filed: Jan. 27, 2023

(65) Prior Publication Data
US 2023/0384221 A1    Nov. 30, 2023

Related U.S. Application Data

(63) Continuation of application No. 16/651,312, filed as application No. PCT/SG2019/050350 on Jul. 19, 2019, now Pat. No. 11,567,007.

(51) Int. Cl.
*G01N 21/64*     (2006.01)
*G01N 21/03*     (2006.01)

(52) U.S. Cl.
CPC ..... *G01N 21/6428* (2013.01); *G01N 21/6452* (2013.01); *G01N 21/6456* (2013.01);
(Continued)

(58) Field of Classification Search
CPC .......... G01N 21/6428; G01N 21/6452; G01N 21/6456
See application file for complete search history.

(56) References Cited

U.S. PATENT DOCUMENTS

| | | |
|---|---|---|
| 2006/0012871 A1 | 1/2006 | Funk et al. |
| 2008/0180950 A1 | 7/2008 | Kang et al. |
| (Continued) | | |

FOREIGN PATENT DOCUMENTS

| | | |
|---|---|---|
| CN | 101893809 | 11/2010 |
| CN | 204084051 | 1/2015 |
| (Continued) | | |

OTHER PUBLICATIONS

Communication with Supplementary European Search Report in EP Patent Application No. 19861276.4 issued by the European Patent Office dated Apr. 21, 2021, 8 pages.
(Continued)

*Primary Examiner* — Hugh Maupin
(74) *Attorney, Agent, or Firm* — McNees Wallace & Nurick LLC

(57) ABSTRACT

Various embodiments may provide a method of illuminating a sample plane. The method may include providing an illumination subsystem, the illumination subsystem including an optical source and at least one lens, having an optic axis at an incident angle greater than 0° and less than 90° to a normal of the sample plane. The method may also include rotating the illumination subsystem about a pivot point between the optical source and the sample plane along the optic axis so that an adjusted illumination distribution generated by the illumination subsystem at the sample plane has greater symmetry compared to a reference illumination distribution generated by the illumination subsystem at the sample plane without the rotation about the pivot point.

20 Claims, 21 Drawing Sheets

(52) U.S. Cl.
CPC ............. *G01N 2021/0325* (2013.01); *G01N 2021/6439* (2013.01); *G01N 2021/6478* (2013.01); *G01N 2201/062* (2013.01)

(56) References Cited

U.S. PATENT DOCUMENTS

| | | | |
|---|---|---|---|
| 2009/0080194 | A1 | 3/2009 | Bouzid et al. |
| 2013/0141715 | A1* | 6/2013 | Urano .................... G01N 21/94 356/237.2 |
| 2015/0008337 | A1 | 1/2015 | Shimizu |
| 2015/0146200 | A1* | 5/2015 | Honda .................. G01J 1/0474 356/237.5 |
| 2016/0327779 | A1 | 11/2016 | Hillman |
| 2017/0351076 | A1* | 12/2017 | Papp ...................... G02B 27/30 |
| 2018/0023947 | A1* | 1/2018 | Meng ................... G01B 11/303 348/46 |
| 2018/0246038 | A1 | 8/2018 | Hunter |
| 2018/0259394 | A1* | 9/2018 | Gotoh .................... G01J 3/504 |
| 2019/0324244 | A1 | 10/2019 | Kozorovitskiy et al. |

FOREIGN PATENT DOCUMENTS

| | | |
|---|---|---|
| CN | 204789341 | 11/2015 |
| DE | 202007003260 | 5/2007 |
| JP | 2005030919 A | 2/2005 |
| JP | 2008135345 A | 6/2008 |
| KR | 20120036230 | 4/2012 |
| KR | 20120120496 | 11/2012 |
| KR | 20170063797 | 6/2017 |
| WO | 2004063731 A1 | 7/2004 |
| WO | 2013137247 A1 | 9/2013 |
| WO | 2016046714 A2 | 3/2016 |

OTHER PUBLICATIONS

Written Opinion of the International Searching Authority, PCT/SG2019/050350 mailed Sep. 5, 2019, form PCT/ISA/237, 4 pages.

* cited by examiner

OPTICAL SYSTEM, AND METHOD OF ILLUMINATING A SAMPLE PLANE

RELATED APPLICATION

This application is a continuation of U.S. patent application Ser. No. 16/651,312, filed Mar. 26, 2020, which is hereby incorporated by reference in its entirety.

TECHNICAL FIELD

Various aspects of this disclosure relate to a method of illuminating a sample plane. Various aspects of this disclosure may relate to an optical system.

BACKGROUND

In certain biological applications (e.g., digital polymerase chain reaction (PCR)), an array of reaction chambers may contain biological samples (such as deoxyribonucleic acids (DNA)) and fluorescent dye. Neighboring reaction chambers may be separated by one or more partitions. In most cases of practical significance, it may be desirable to have consistent fluorescent signals (or at least approximately consistent fluorescent signals) from all partitions within an array (or, in the case of two or more arrays, consistent fluorescent signals from all partitions across the arrays). By "consistent signals", it is meant that when equal concentrations of dye are present in each partition, then each partition would give rise to equal fluorescence when illuminated by the instrument's source.

From an optical system design standpoint, in order to have consistent fluorescent signals from each partition within an array of partitions, it is required to achieve uniform illumination onto the array of partitions. Due to the fundamental nature of light to spread from its source as it travels onto a screen, the resulting illumination distribution is often non-uniform. FIG. 1A is a schematic depicting a condition where an illumination subsystem provides direct illumination onto the sample plane at normal incidence (i.e., 0 degrees incident angle), which results in non-uniform light distribution (the central area is brighter than the edges). FIG. 1B is another schematic depicting the use of a beam splitter (as is commonly done in fluorescence detection) to reflect the light down onto the sample plane. The reflection is merely a "mirror image" of direct illumination. Hence, this also results in the same type of non-uniformity at the sample plane.

In some cases of practical significance in fluorescence detection, one may wish to illuminate the sample plane without the use of a beam splitter (e.g., to eliminate stray light issues related to the beam splitter, or to reduce the cost of the instrument by not including beam splitters). In such cases, one would illuminate the sample plane at oblique incidence (i.e., incident angle>0 degrees), as illustrated in FIG. 2. FIG. 2 is a schematic illustrating the illumination at oblique incidence for fluorescence detection with resulting asymmetric light distribution at the sample plane. In this case, an asymmetrical non-uniformity results, i.e. the edge that is closer to the lens is brighter than the edge that is farther from the lens.

SUMMARY

Various embodiments may provide a method of illuminating a sample plane. The method may include providing an illumination subsystem, the illumination subsystem including an optical source and at least one lens, having an optic axis at an incident angle greater than 0° and less than 90° to a normal of the sample plane. The method may also include rotating the illumination subsystem about a pivot point between the optical source and the sample plane along the optic axis so that an adjusted illumination distribution generated by the illumination subsystem at the sample plane has greater symmetry compared to a reference illumination distribution generated by the illumination subsystem at the sample plane without the rotation about the pivot point.

Various embodiments may provide an optical system. The optical system may include an illumination subsystem including an optical source and at least one lens, the illumination subsystem having an optic axis at an incident angle greater than 0° and less than 90° to a normal of a sample plane. The illumination subsystem may be rotated or may be rotatable about a pivot point between the optical source and the sample plane along the optic axis so that an adjusted illumination distribution generated by the illumination subsystem at the sample plane has greater symmetry compared to a reference illumination distribution generated by the illumination subsystem at the sample plane without the rotation about the pivot point.

BRIEF DESCRIPTION OF THE DRAWINGS

The invention will be better understood with reference to the detailed description when considered in conjunction with the non-limiting examples and the accompanying drawings, in which.

DETAILED DESCRIPTION

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, and logical changes may be made without departing from the scope of the invention. The various embodiments are not necessarily mutually exclusive, as some embodiments can be combined with one or more other embodiments to form new embodiments.

Embodiments described in the context of one of the methods or optical systems are analogously valid for the other methods or optical systems. Similarly, embodiments described in the context of a method are analogously valid for an optical system, and vice versa.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

In the context of various embodiments, the articles "a", "an" and "the" as used with regard to a feature or element include a reference to one or more of the features or elements.

In the context of various embodiments, the term "about" or "approximately" as applied to a numeric value encompasses the exact value and a reasonable variance.

As used herein, the term "and/or" includes any and all combinations of one or more of the associated listed items.

Various embodiments may seek to address asymmetrical non-uniformity at oblique illumination.

Figure 2:
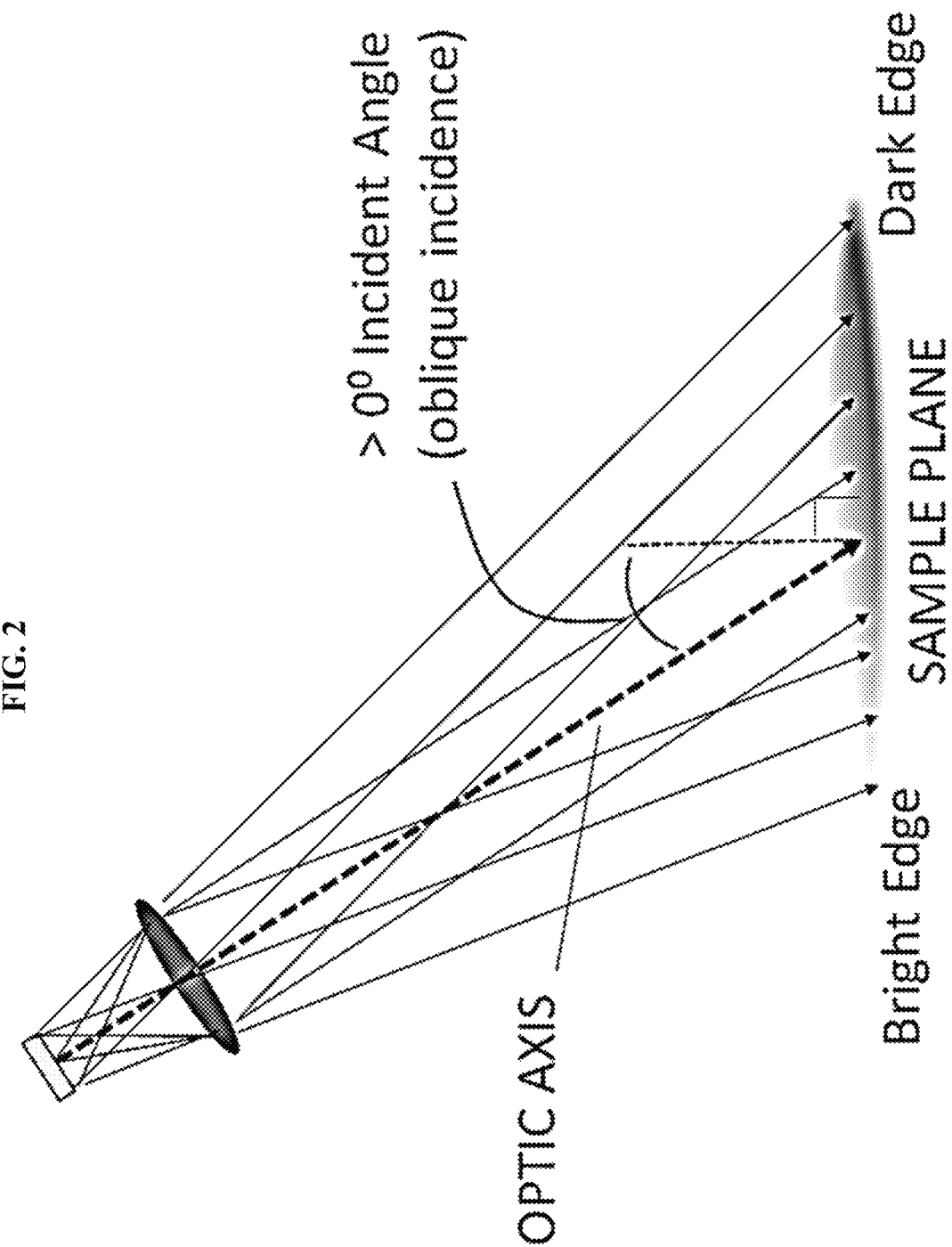
FIG. 2 is a schematic illustrating the illumination at oblique incidence for fluorescence detection with resulting asymmetric light distribution at the sample plane.

The reason why there is asymmetry in the sample plane in FIG. 2 when illuminating at oblique incidence is partially because of the $1/r^2$ (one over radius squared) dependence of light intensity, where r is the distance from the source to the illumination plane (i.e. the sample plane). The smaller the distance between the source and the illumination plane, the higher the intensity. Conversely, the farther away the source is from the illumination plane, the lesser the intensity. Consequently, since the right-edge of the illumination in FIG. 2 is farther from the source (in this case, we may consider the illumination subsystem including the lens and light source together as "the source"), the illumination intensity at that area is darker. Conversely, since the left-edge of the illumination plane in FIG. 2 is closer to the source, it is brighter there.

Figure 1A:
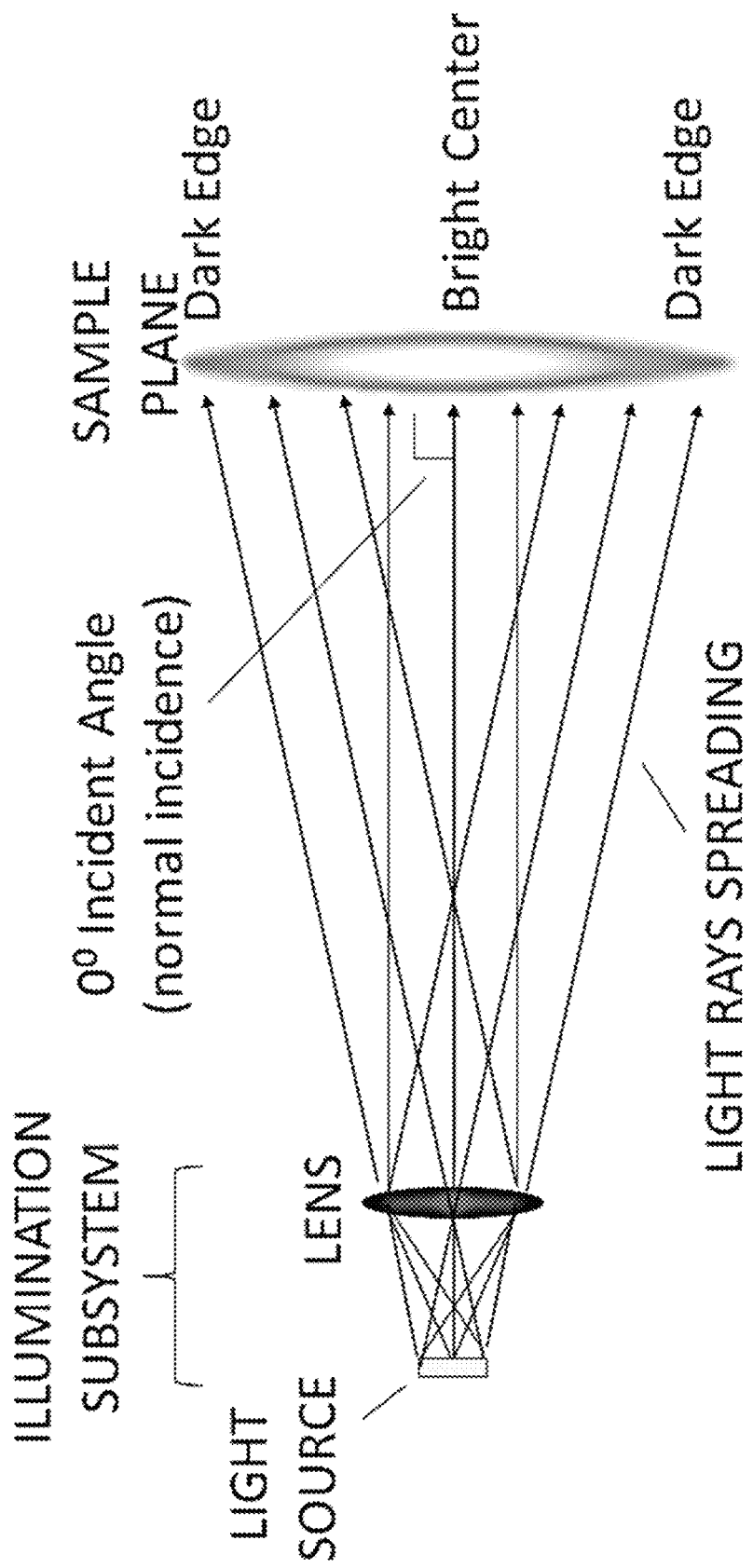
FIG. 1A is a schematic depicting a condition where an illumination subsystem provides direct illumination onto the sample plane at normal incidence (i.e., 0 degrees incident angle), which results in non-uniform light distribution (the central area is brighter than the edges).
Figure 1B:
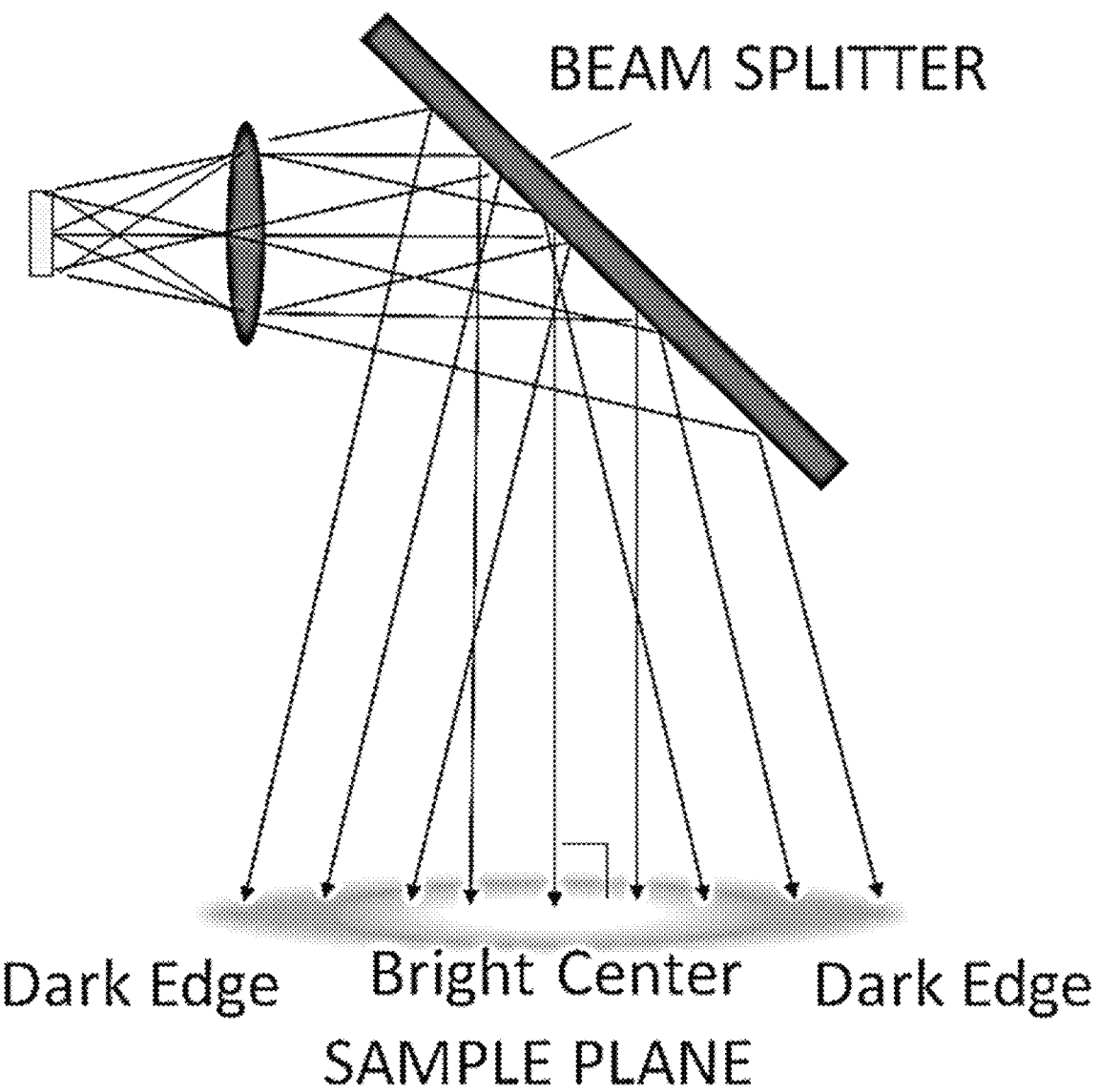
FIG. 1B is another schematic depicting the use of a beam splitter (as is commonly done in fluorescence detection) to reflect the light down onto the sample plane.

Based on the principles of optical radiometry, the intensity distribution on the illumination plane at oblique incidence may actually not be just a function of the distance between the source and the plane; it may also be a function of the angle of incidence of the rays on the plane, as well as the intensity distribution of the central bright spot depicted in FIGS. 1A-B at the sample plane. Whenever a lens collects light rays from a uniform source (e.g., a light emitting diode (LED)), there will always be a central bright beam within the entire collection of rays coming out of the lens towards a screen. Consequently, the final intensity distribution seen at the sample plane in FIG. 2 may depend on a combination of the effects from the distribution profile of the central bright spot, from the $1/r^2$ dependence of light intensity, and from the angle of incidence of the rays. For instance, even if the left-side of the illumination plane in FIG. 2 is closer to the source, the brightest part of the illumination intensity may be shifted a little towards the right-side of the left-edge, causing the left-side of the sample plane to be a little less bright. Thus, the brightest position across the sample plane at oblique illumination may not necessarily be the left-most edge of the plane. Rather, the brightest spot may slightly be towards the right of the left-edge, but it is not at the center of the plane.

Various embodiments may relate to shifting the brightest position of illumination at oblique incidence towards the center of the sample plane by performing a rotation or "second tilt" of the illumination subsystem (i.e., tilting the lens and light source together) about an axis anywhere close to the lens.

Figure 3:
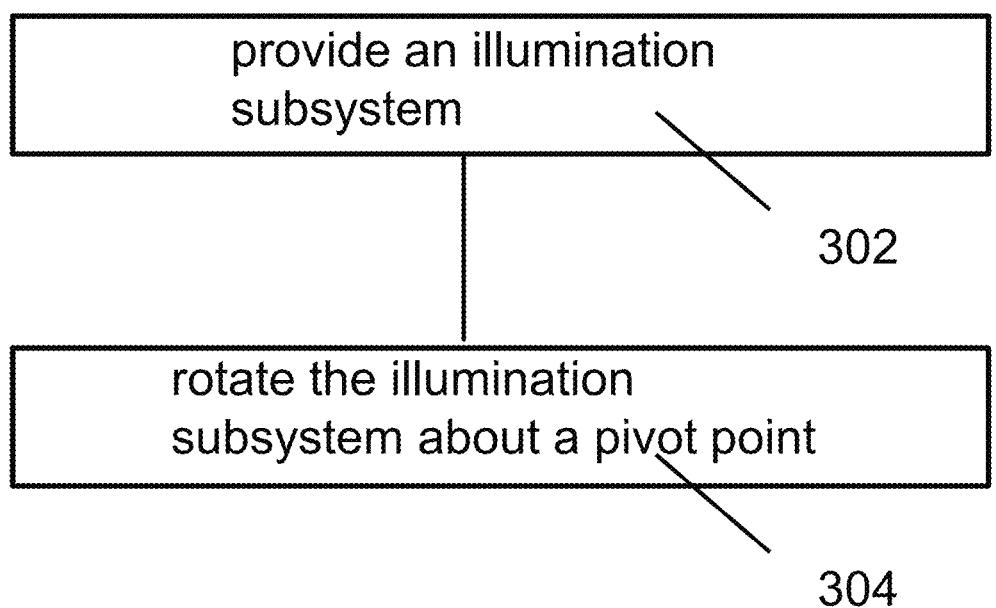
FIG. 3 is a general illustration of a method of illuminating a sample plane according to various embodiments.

FIG. 3 is a general illustration of a method of illuminating a sample plane according to various embodiments. The method may include, in 302, providing an illumination subsystem, the illumination subsystem including an optical source and at least one lens, having an optic axis at an incident angle greater than 0° and less than 90° to a normal of the sample plane. The method may also include, in 304, rotating the illumination subsystem about a pivot point between the optical source and the sample plane along the optic axis so that an adjusted illumination distribution generated by the illumination subsystem at the sample plane has greater symmetry compared to a reference illumination distribution generated by the illumination subsystem at the sample plane without the rotation about the pivot point.

In other words, various embodiments may relate to positioning an illumination subsystem so that the optic axis of the illumination subsystem makes an incident angle selected from a range that is greater than 0° and less than 90° to a normal of the sample plane. The illumination subsystem may include an optical source and at least one lens. The method may further include tilting or rotating the illumination subsystem about a pivot point found along the optic axis, so that an adjusted illumination distribution generated by the illumination subsystem with the tilt or rotation about the pivot point is more symmetrical than a reference illumination distribution (i.e. an oblique illumination distribution) generated by the illumination subsystem without the tilt or rotation (i.e. the subsystem positioned with the optic axis at the incident angle to the normal of the sample plane without rotation about the pivot point).

The rotation or tilting of the illumination subsystem about the pivot point may be referred to as a "second tilt".

In various embodiments, the adjusted illumination distribution generated by the illumination subsystem at the sample plane may be symmetrical such that a point at the center of the adjusted illumination distribution is the highest. Symmetrical illumination distribution may be achieved without the use of multiple light sources at opposite oblique incident angles, and also without the use of normal-incident illumination or the use of beam splitters to fold the beam down onto the sample plane. Instead, symmetrical illumination distribution may be achieved by projecting beams from optical sources through the at least one lens.

An angle in which the illumination subsystem is rotated (about the pivot point, for the second tilt) may be dependent on the incident angle, the optical source, the at least one lens, a position of the pivot point along the optic axis, a distance between the optical source and the at least one lens, and/or a distance between the optical source and the sample plane.

The optic axis may be referred to as an original optic axis. Upon tilting or rotating the illumination subsystem about the pivot point, the illumination subsystem may be along a further optic axis (which may also be referred to as a new optic axis) that is different from the optic axis. The pivot point may be at the intersection of the optic axis and the further optic axis. The further optic axis may have a further incident angle greater than 0° and less than 90° to the normal of the sample plane. The incident angle of the optic axis and the further incident angle of the further optic axis may be different.

In various embodiments, the optical source and the at least one lens may be aligned along the optic axis before rotation of the illumination subsystem about the pivot point. After the rotation of the illumination subsystem about the pivot point, the optical source and the at least one lens may be aligned along the further optic axis.

In various embodiments, the at least one lens may consist of a single lens.

In various embodiments, the illumination subsystem may include three optical sources, three lenses, as well as 5 excitation filters and 5 emission filters for mixing and matching different wavelengths.

In various embodiments, the sample plane may be formed by an array of reaction chambers.

Each reaction chamber of the array of reaction chambers may be configured to contain fluorescence dye such that fluorescence is generated by the fluorescence dye upon illumination by the illumination subsystem.

In various embodiments, the method may also include providing an excitation filter between the optical source and the sample plane. The excitation filter may be configured to filter the light generated by the optical source. The method may also include providing an imaging lens over the sample plane. The imaging lens may be configured to focus the fluorescence generated by the dye upon illumination by the illumination subsystem. In various embodiments, the method may also include providing an emission filter between the imaging lens and the sample plane. The emission filter may be configured to separate the fluorescence generated by the dye from the light generated by the optical source and reflected by the sample plane.

In some situations, each reaction chamber may contain or may be configured to contain equal amounts of fluorescence dye. The fluorescence generated by the reaction chambers may be symmetrical if the amount of biological sample provided to each of the reaction chamber is also equal.

In other situations, the amount of dye in each reaction chamber may be different. Some of these situations may include: (a) a real-time polymerase chain reaction (PCR) system including the optical system according to various embodiments. It may be possible that groups of reaction chambers receive different concentrations of target deoxyribonucleic acid (DNA) (which are tagged with dyes); (b) a digital PCR system including the optical system according to various embodiments. Due to Poisson statistics, there is an average number of target DNA entering each chamber. Consequently, a variance of target DNA molecules exists across all reaction chambers (and hence, a variance of dyes tagged to the DNA molecules exists).

However, it may be desirable to provide symmetric illumination across all reaction chambers, regardless of the differing amounts of dye and associated target DNA molecules. This is because in order to determine whether there is indeed different fluorescence from each reaction chamber (due to varying amounts of dye), one has to have a uniform illumination onto the reaction chambers for comparison. Uniform illumination may be required to determine differences in dye concentrations across reaction chambers.

In various embodiments, the optical source may be configured to generate visible light, infrared light, or ultraviolet light. In various embodiments, the optical source may be configured to generate any combinations of visible light, infrared light, and ultraviolet light.

In various embodiments, the optical source may be a light emitting diode.

In one implementation, the distance between the optical source and the at least one lens may be about 60 mm, the distance between the optical source and the sample plane may be about 220 mm, the incident angle may be about 17°, and the illumination subsystem may be rotated about 2.7° about the pivot point (for the second rotation or tilt).

In another implementation, the distance between the optical source and the at least one lens may be about 30 mm, the distance between the optical source and the sample plane may be about 110 mm, the incident angle may be about 22°, and the illumination subsystem may be rotated about 1.3° about the pivot point.

Figure 4:
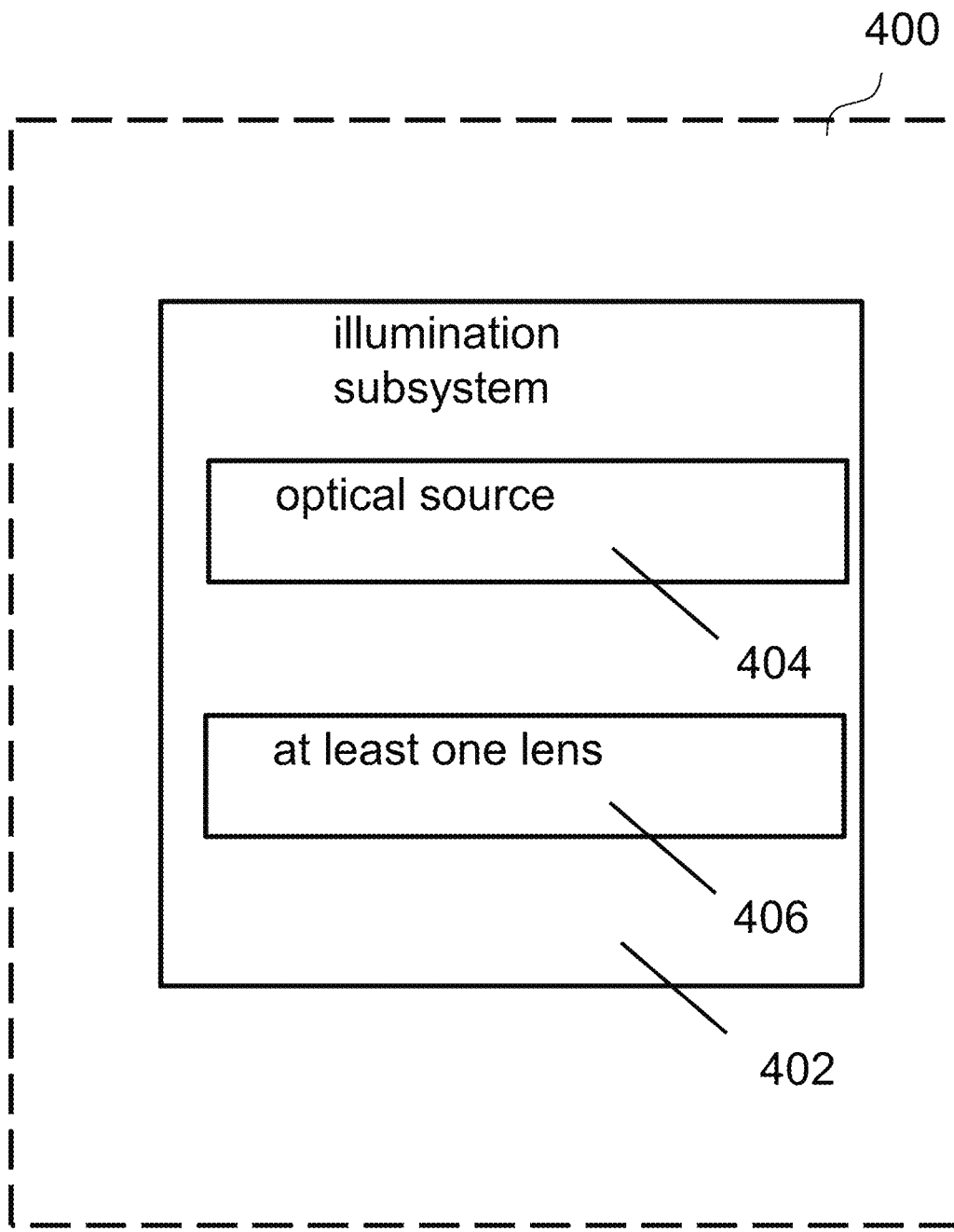
FIG. 4 is a general illustration of an optical system according to various embodiments.

FIG. 4 is a general illustration of an optical system 400 according to various embodiments. The optical system 400 may include an illumination subsystem 402 including an optical source 404 and at least one lens 406, the illumination subsystem 402 having an optic axis at an incident angle greater than 0° and less than 90° to a normal of a sample plane. The illumination subsystem 402 may be rotated or may be rotatable about a pivot point between the optical source 404 and the sample plane along the optic axis so that an adjusted illumination distribution generated by the illumination subsystem 402 at the sample plane has greater symmetry compared to a reference illumination distribution generated by the illumination subsystem 402 at the sample plane without the rotation about the pivot point. The optical system 400 may be configured to illuminate the sample plane.

In other words, an optical system 400 including an illumination subsystem 402 may be provided. The illumination subsystem 402 may include an optical source 404 and at least one lens 406. The illumination subsystem 402 may have an optic axis at an incident angle selected from a range greater than 0° and less than 90° to a normal of a sample plane. The illumination subsystem 402 may be rotated or tilted about a pivot point along the optic axis so that an adjusted illumination distribution generated by the illumination subsystem 402 with the rotation or tilt about the pivot point is more symmetrical than a reference illumination distribution (i.e. an oblique illumination distribution) generated by the illumination subsystem 402 without the tilt or rotation (i.e. the subsystem positioned with the optic axis at the incident angle to the normal of the sample plane without rotation about the pivot point).

An angle in which the illumination subsystem 402 is rotated (about the pivot point, for the second tilt) may be dependent on the incident angle, the optical source 404, the at least one lens 406, a position of the pivot point along the optic axis, a distance between the optical source 404 and the at least one lens 406, and/or a distance between the optical source 404 and the sample plane.

Upon tilting or rotating the illumination subsystem 402 about the pivot point, the illumination subsystem 402 may be along a further optic axis that is different from the optic axis. The pivot point may be at the intersection of the optic axis and the further optic axis. The further optic axis may be at a further incident angle greater than 0° and less than 90° to the normal of the sample plane.

In various embodiments, pivot point may be implemented by a pivot. The subsystem 402 may further include a frame holding the optical source 404 and the at least one lens 406. The frame may be attached to the pivot so that the optical source 404 and the at least one lens 406 may be rotated or rotatable about the pivot point. In various embodiments, the angle in which the illumination subsystem 402 is rotated may be fixed during manufacturing or assembly of the optical system 400. The optical system 400 may include a frame to hold the optical source 404 and the at least one lens 406.

In various embodiments, the adjusted illumination distribution generated by the illumination subsystem 402 at the sample plane may be symmetrical such that a point at the center of the adjusted illumination distribution is the highest.

In various embodiments, the optical source 404 and the at least one lens 406 may be aligned along the optic axis.

In various embodiments, the illumination subsystem 402 may include an excitation filter between the optical source 404 and the sample plane.

In various embodiments, the optical system 400 may include an imaging lens over the sample plane. The optical system 400 may include an emission filter between the imaging lens and the sample plane.

In various embodiments, the optical system 400 may include an array of reaction chambers to form the sample plane. Each reaction chamber of the array of reaction chambers may be configured to contain fluorescence dye such that fluorescence is generated by the fluorescence dye upon illumination by the illumination subsystem.

In various embodiments, the optical source 404 may be configured to generate visible light, infrared light, or ultraviolet light. The optical source 404 may be configured to generate any combination of visible light, infrared light, and ultraviolet light.

The optical source 404 may be configured to generate a single wavelength of light or may be configured to generate a plurality of wavelengths of light.

The optical source 404 may be a light emitting diode.

In one implementation, the distance between the optical source 404 and the at least one lens 406 may be about 60 mm, the distance between the optical source 404 and the sample plane may be about 220 mm, the incident angle may be about 17°, and the illumination subsystem 402 may be rotated about 2.7° about the pivot point (for the second rotation or tilt).

In another implementation, the distance between the optical source 404 and the at least one lens 406 may be about 30 mm, the distance between the optical source 404 and the sample plane may be about 110 mm, the incident angle may be about 22°, and the illumination subsystem 402 may be rotated about 1.3° about the pivot point.

Various embodiments may relate to an optical system having an illumination subsystem configured to generate a symmetrical illumination distribution at a sample plane. The illumination subsystem may include an optical source and at least one lens. The optical source and the at least one lens may be aligned or arranged such that a straight line (i.e. the further optic axis) passing through a center of the optical source and a center of the at least one lens is at an angle between 0° to 90° from a normal of the sample plane.

Various embodiments may relate to a method of forming an optical system having an illumination subsystem configured to generate a symmetrical illumination distribution at a sample plane. The illumination subsystem may include an optical source and at least one lens. The optical source and the at least one lens may be aligned or arranged such that a straight line (i.e. the further optic axis) passing through a center of the optical source and a center of the at least one lens is at an angle between 0° to 90° from a normal of the sample plane. The optical system as described here may be a biological entity detection system. The biological entity detection system may be configured to detect a biological sample containing biological entities such as DNA. In various embodiments, the system may include one or more microfluidic channels configured to carry biological entities to the array of reaction chambers. The system may also include one or more microfluidic channels configured to carry fluorescence dye to the array of reaction chambers.

Figure 5:
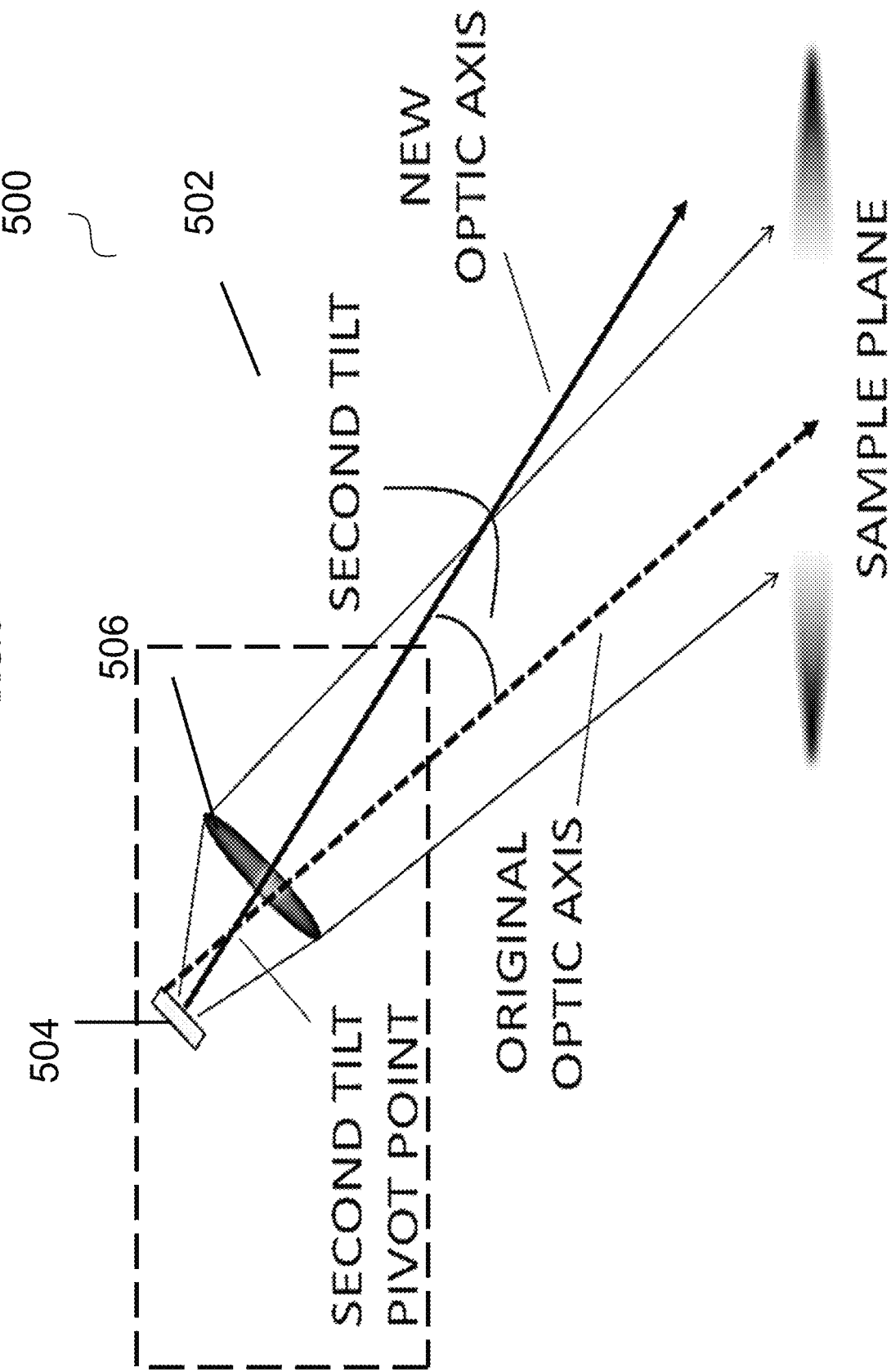
FIG. 5 is a schematic of an optical system illustrating the rotation of the illumination subsystem about a pivot point or axis close to the lens of the illumination subsystem according to various embodiments.

FIG. 5 is a schematic of an optical system 500 illustrating the rotation of the illumination subsystem 502 about a pivot point or axis close to the lens 506 of the illumination subsystem 502 according to various embodiments. The rotation of the illumination subsystem 502 as shown in FIG. 5 is counter-clockwise. In various other embodiments, the rotation may be clockwise. The rotation of the illumination subsystem 502 may result in an improved symmetry of illumination distribution within the central area of illumination at the sample plane. The illumination subsystem 502 may include an optical source 504 and a lens 506.

The rotation of the illumination subsystem 502 may be referred to as a "second tilt", and may be a rotation of the source 504 and the lens 506 about the pivot point close to the lens.

The "first tilt" refers to the orientation of the illumination subsystem about a point on the sample plane, and which may result in an oblique angle of illumination, i.e. the incident angle measured relative to the surface normal of the sample plane.

As shown in FIG. 5, the rotation of the illumination subsystem 502 about the pivot point may result in a new optical axis pointing away from the center of the sample plane, and may result in symmetry of illumination about the center of the sample plane.

Figure 6A:
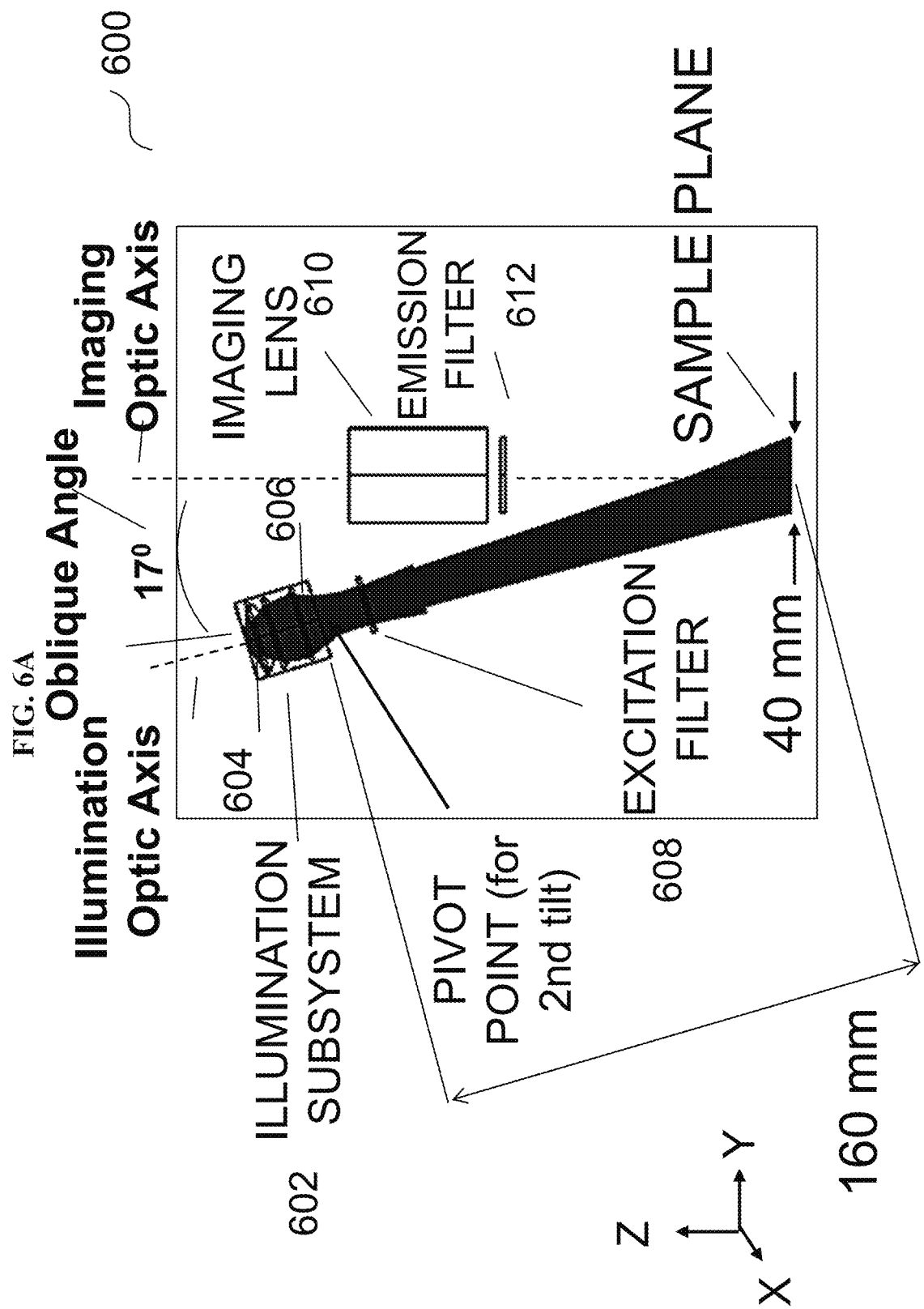
FIG. 6A is an optical design model and simulation of an optical system according to various embodiments implemented on a breadboard.
Figure 6B:
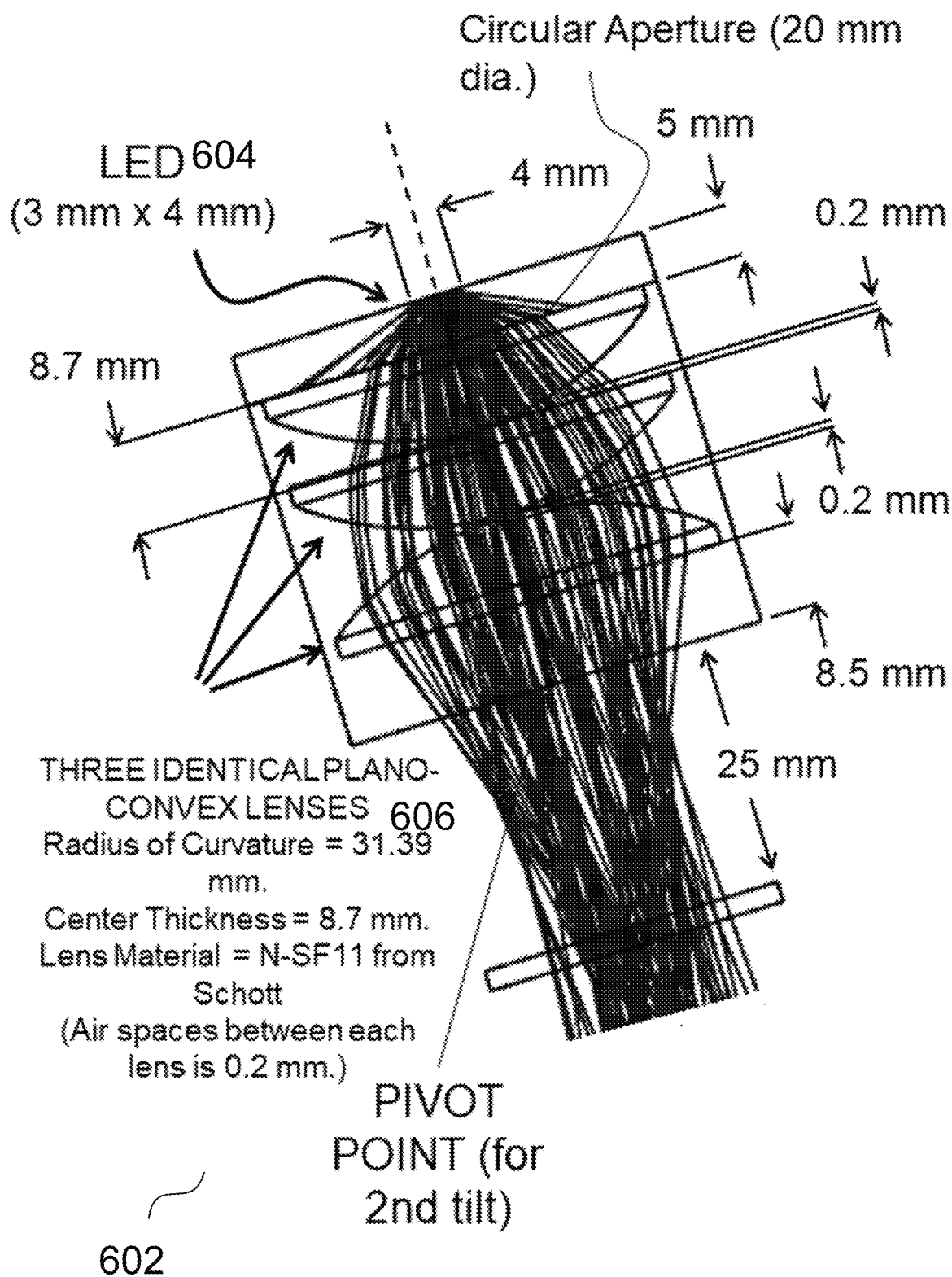
FIG. 6B show the illumination subsystem of the optical system shown in FIG. 6A according to various embodiments.

FIG. 6A is an optical design model and simulation of an optical system 600 according to various embodiments implemented on a breadboard. FIG. 6A shows the optical design model and simulated rays striking the sample plane, which is about 40 mm in length, and about 30 mm in width. The illumination subsystem 602 may include a blue light emitting diode (LED) 604, and three plano-convex lenses 606 in front of the LED 604. FIG. 6B show the illumination subsystem 602 of the optical system 600 shown in FIG. 6A according to various embodiments. As shown in FIG. 6B, there may be a 20 mm diameter circular aperture at 5 mm in front of the diode 604. The aperture may be defined by an annulus with an inner diameter of 20 mm. The outer circumference of the annulus may be mounted to a mechanical housing of the illumination subsystem 602. The three plano-convex lenses 606 may be arranged in such a way to collect light rays and project surface of the LED 604 towards the sample plane. The sample plane is about 220 mm from the surface of the LED, and 160 mm from the front of the imaging lenses 606. The diode 604 may be from Luminus (part number PT-121-B). The emission of the diode 604 may have a narrow waveband, with peak at around 460 nm. However, it may be envisioned that any other suitable LED or optical source may be used.

As shown in FIG. 6A, the optical system 600 may also include an excitation filter 608 between the optical source 604 and the sample plane. The optical system 600 may also include an imaging lens 610 over the sample plane. The optical system 600 may further include an emission filter 612 between the imaging lens 610 and the sample plane.

Figure 7A:
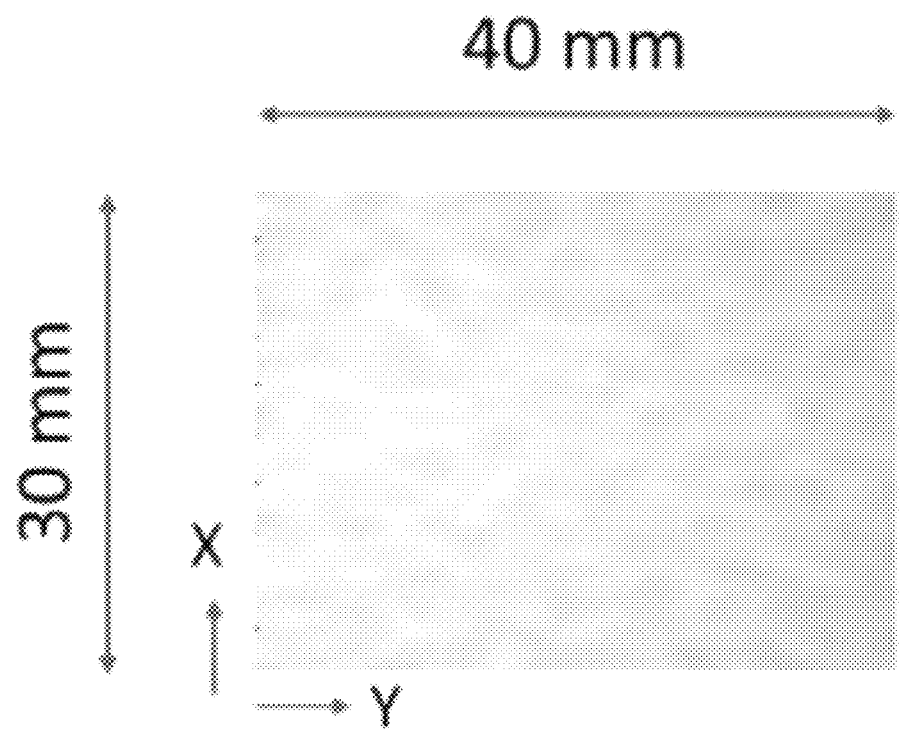
FIG. 7A is an image illustrating the surface two-dimensional (2D) profile of the asymmetrical non-uniform illumination distribution.
Figure 7B:
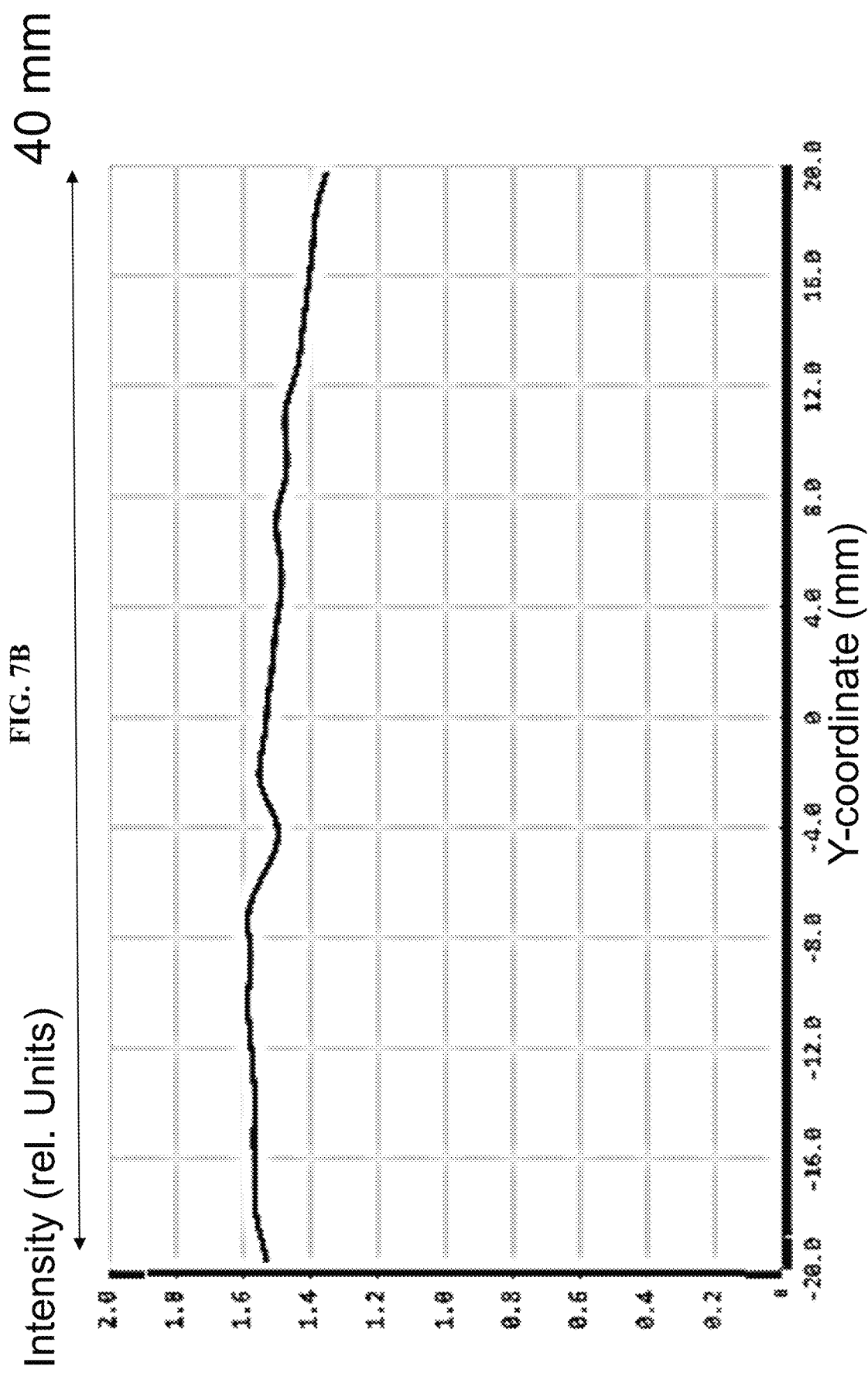
FIG. 7B is a plot of intensity (in relative units or rel. units) as a function of the y-coordinates (in millimeters or mm) showing the y-dimensional profile of the asymmetrical non-uniform illumination distribution.

The oblique incident angle may be about 17°, while the second tilt may initially be set to about 0° to illustrate the resulting simulated asymmetrical non-uniform illumination distribution. FIG. 7A is an image illustrating the surface two-dimensional (2D) profile of the asymmetrical non-uniform illumination distribution. FIG. 7B is a plot of intensity (in relative units or rel. units) as a function of the y-coordinates (in millimeters or mm) showing the y-dimensional profile of the asymmetrical non-uniform illumination distribution.

By maintaining the oblique angle at about 17°, and by performing a second tilt of about 2.7° on the illumination subsystem about the pivot point, the symmetry of the illumination may be improved.

Figure 8A:
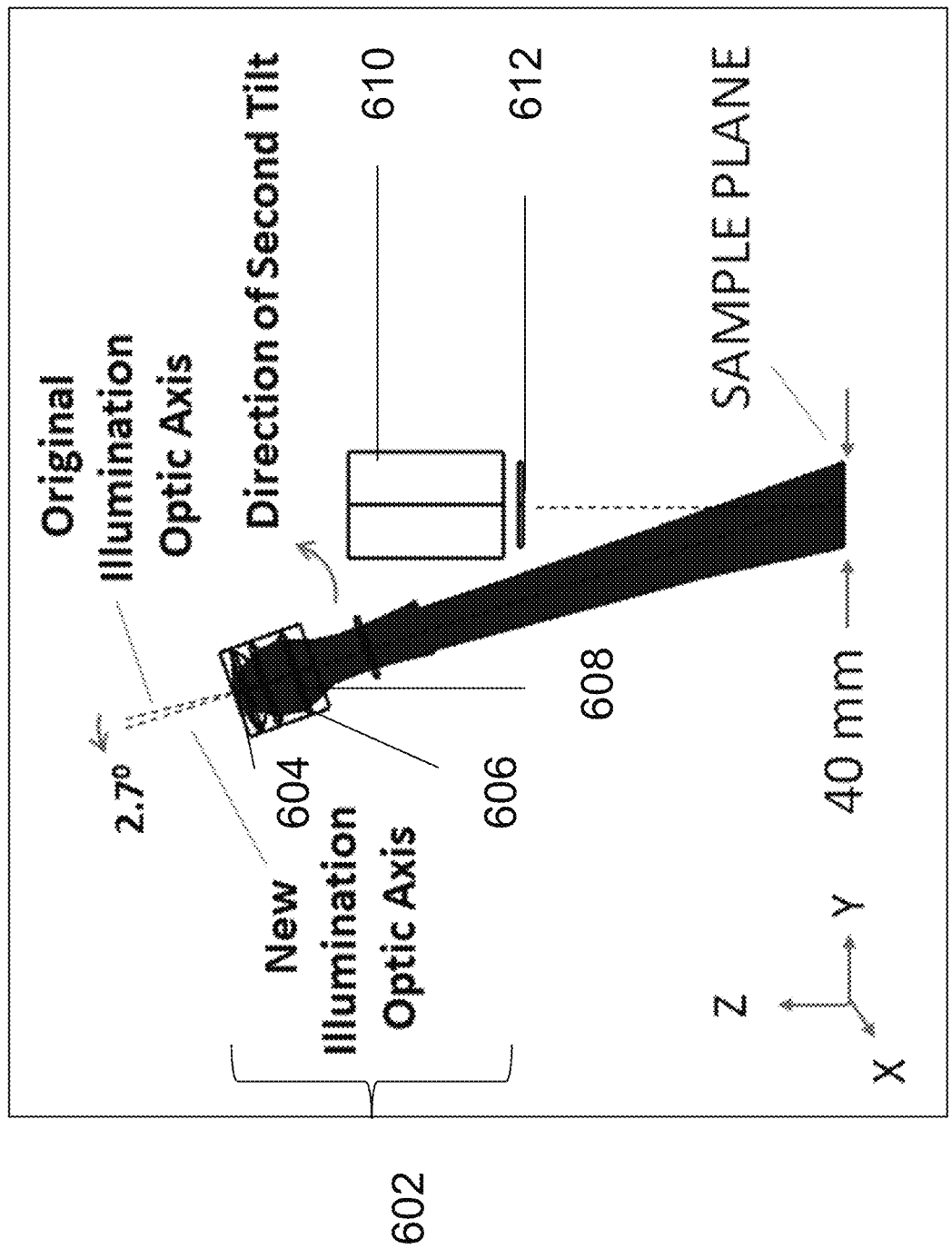
FIG. 8A is a schematic of the optical system as shown in FIG. 6A according to various embodiments, but with a second tilt of 2.7°.
Figure 8B:
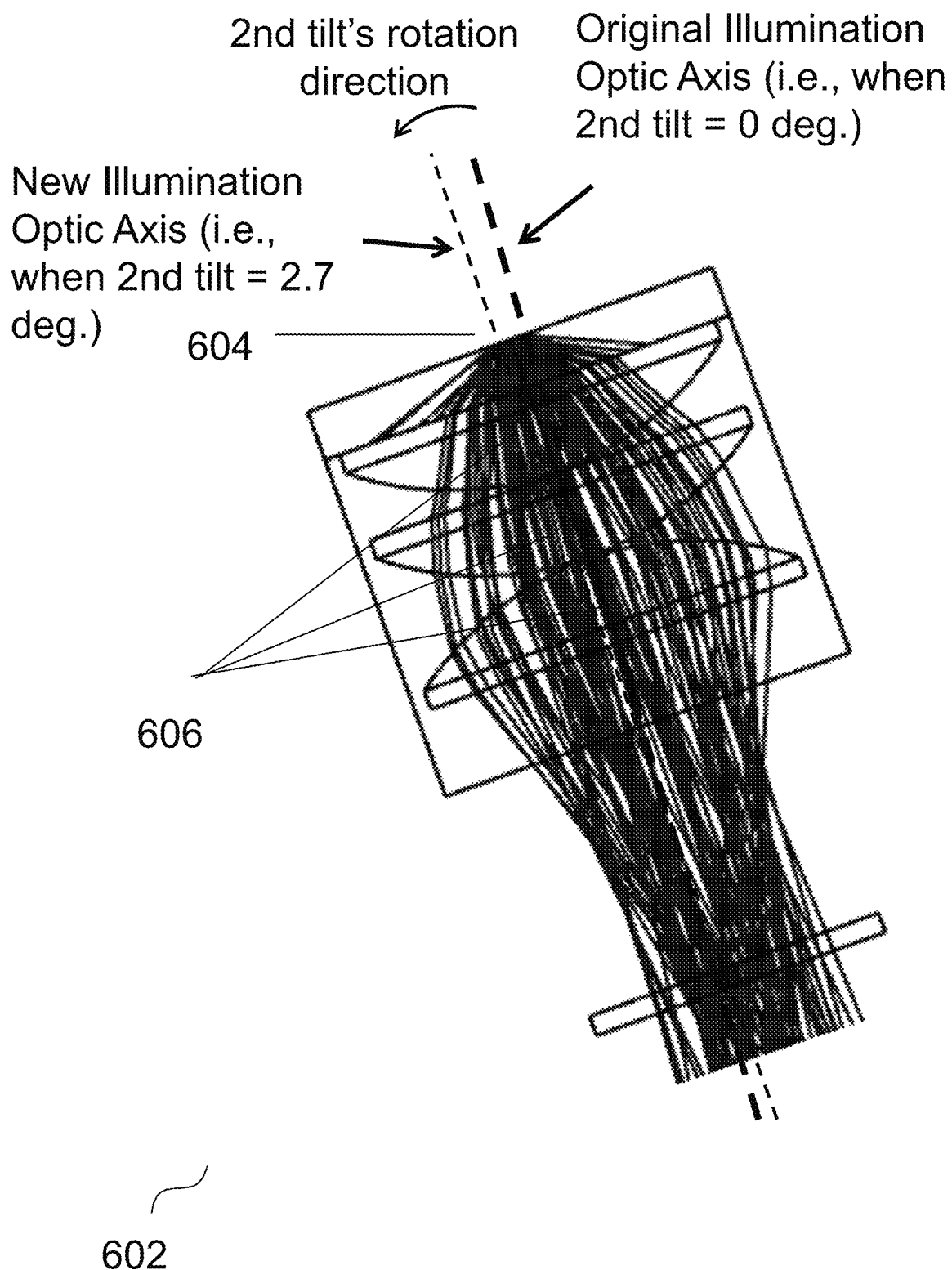
FIG. 8B is a schematic of the optical illumination subsystem of the optical system shown in FIG. 8A according to various embodiments.

FIG. 8A is a schematic of the optical system 600 as shown in FIG. 6A according to various embodiments, but with a second tilt of 2.7°. The second tilt of 2.7° may shift the illumination beam in the y-direction, resulting in an illumination distribution with improved symmetry. FIG. 8B is a schematic of the optical illumination subsystem of the optical system 600 shown in FIG. 8A according to various embodiments. The corresponding features are labelled with the same reference numbers.

Figure 9A:
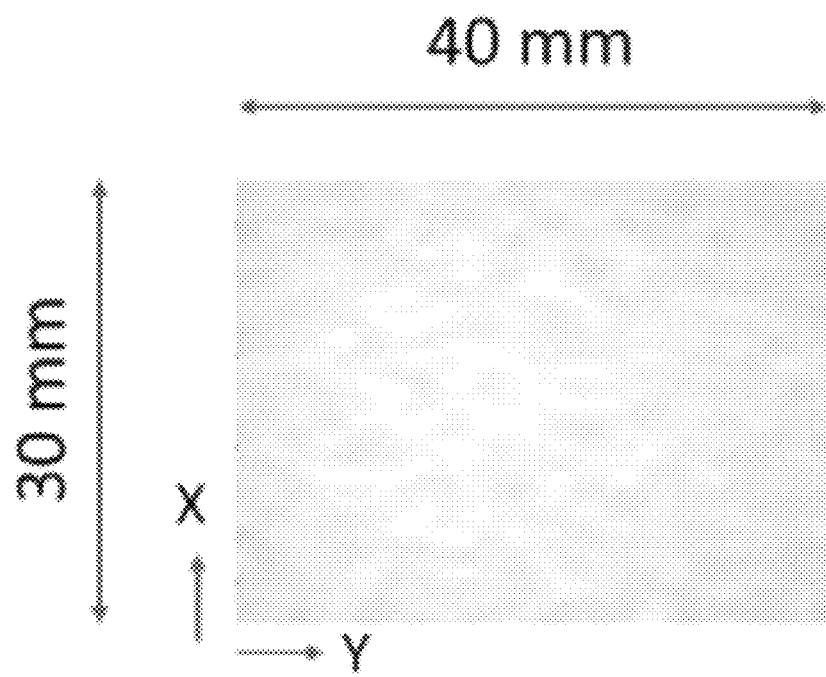
FIG. 9A is an image illustrating the surface two-dimensional (2D) profile of the illumination with improved symmetry according to various embodiments.
Figure 9B:
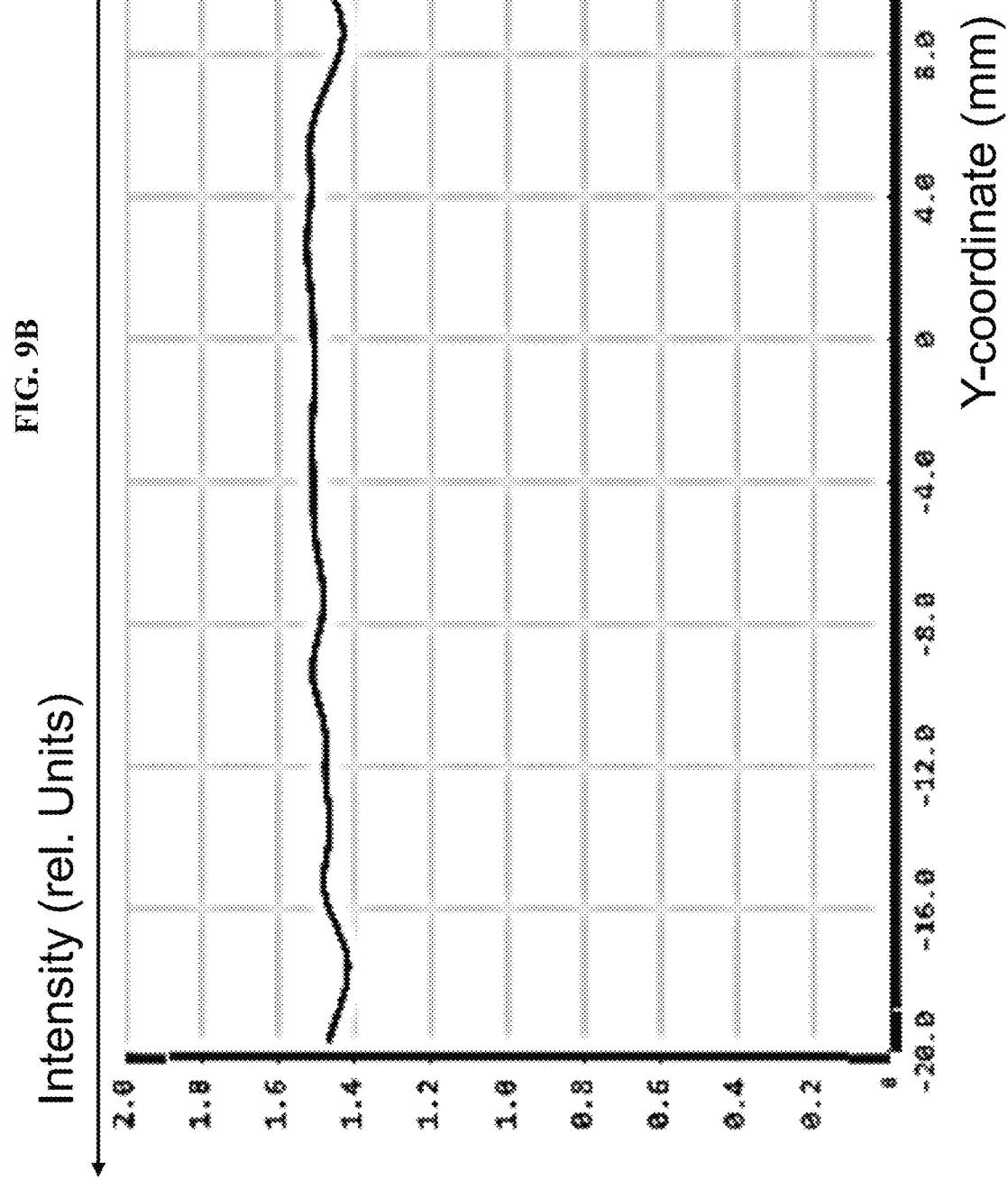
FIG. 9B is a plot of intensity (in relative units or rel. units) as a function of the y-coordinates (in millimeters or mm) showing the y-dimensional profile of the illumination distribution with improved symmetry.

FIG. 9A is an image illustrating the surface two-dimensional (2D) profile of the illumination with improved symmetry according to various embodiments. FIG. 9B is a plot of intensity (in relative units or rel. units) as a function of the y-coordinates (in millimeters or mm) showing the y-dimensional profile of the illumination distribution with improved symmetry.

Figure 10:
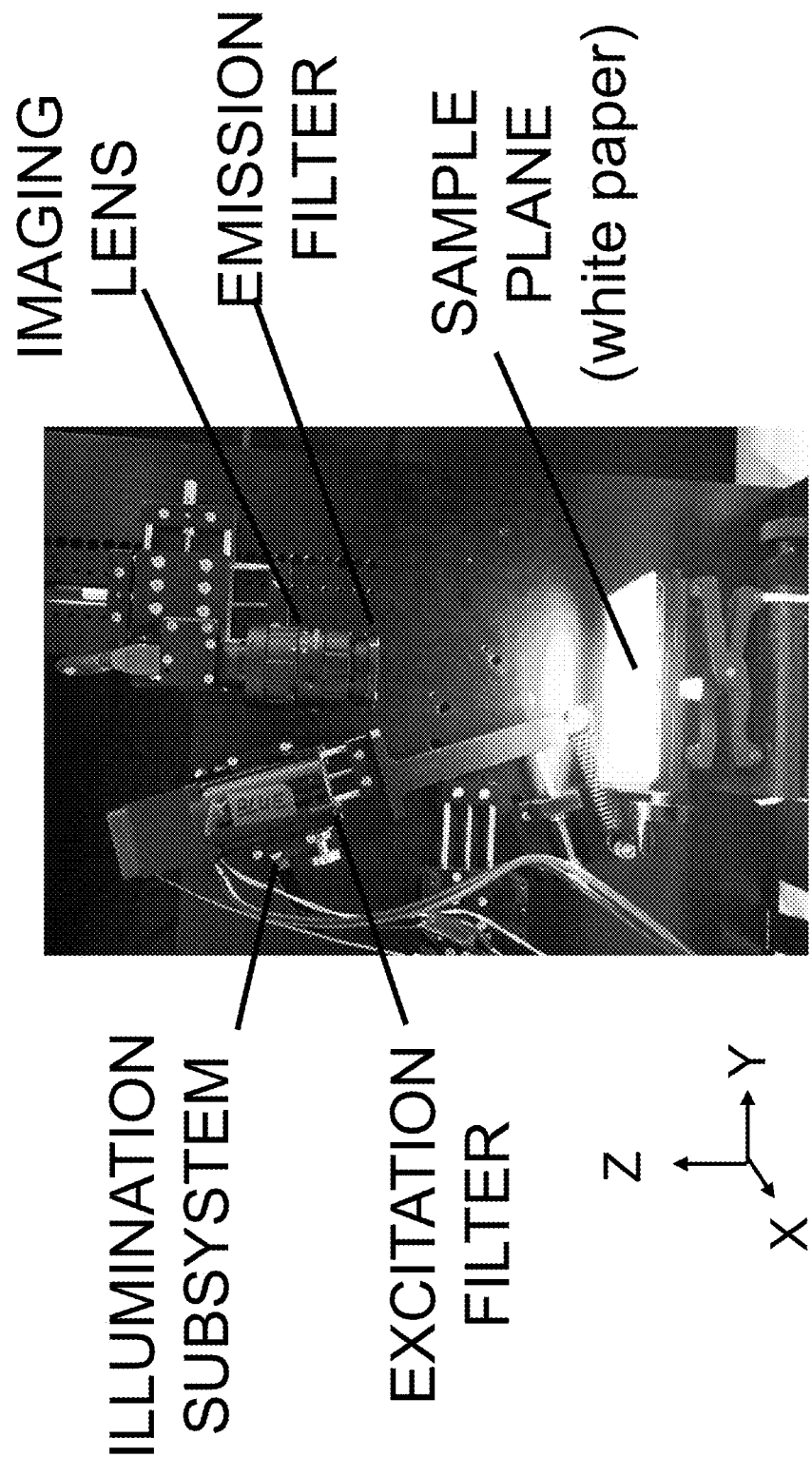
FIG. 10 is an image of a breadboard construction of the optical system shown in FIG. 6 and FIG. 8 according to various embodiments.

FIG. 10 is an image of a breadboard construction of the optical system 600 shown in FIG. 6 and FIG. 8 according to various embodiments. In this setup, a blue LED has been used as the light source, which is integrated into the illumination subsystem. A forward current of 1 ampere was fed into the LED, giving rise to the bright illumination onto the sample plane. At the sample plane, a white paper cut-out from regular A4 size white sheets that is often used for printing and photocopying documents was used. The reason white paper was used as a sample is because white paper is naturally fluorescent when excited with blue illumination, giving off a broad green emission, which is brightly visible through the emission filter and imaging lens. At the focal plane of the imaging lens, a 20-megapixel complementary metal oxide semiconductor (CMOS) sensor from FLIR with 2.4-micron pixel size is mounted.

Figure 11A:
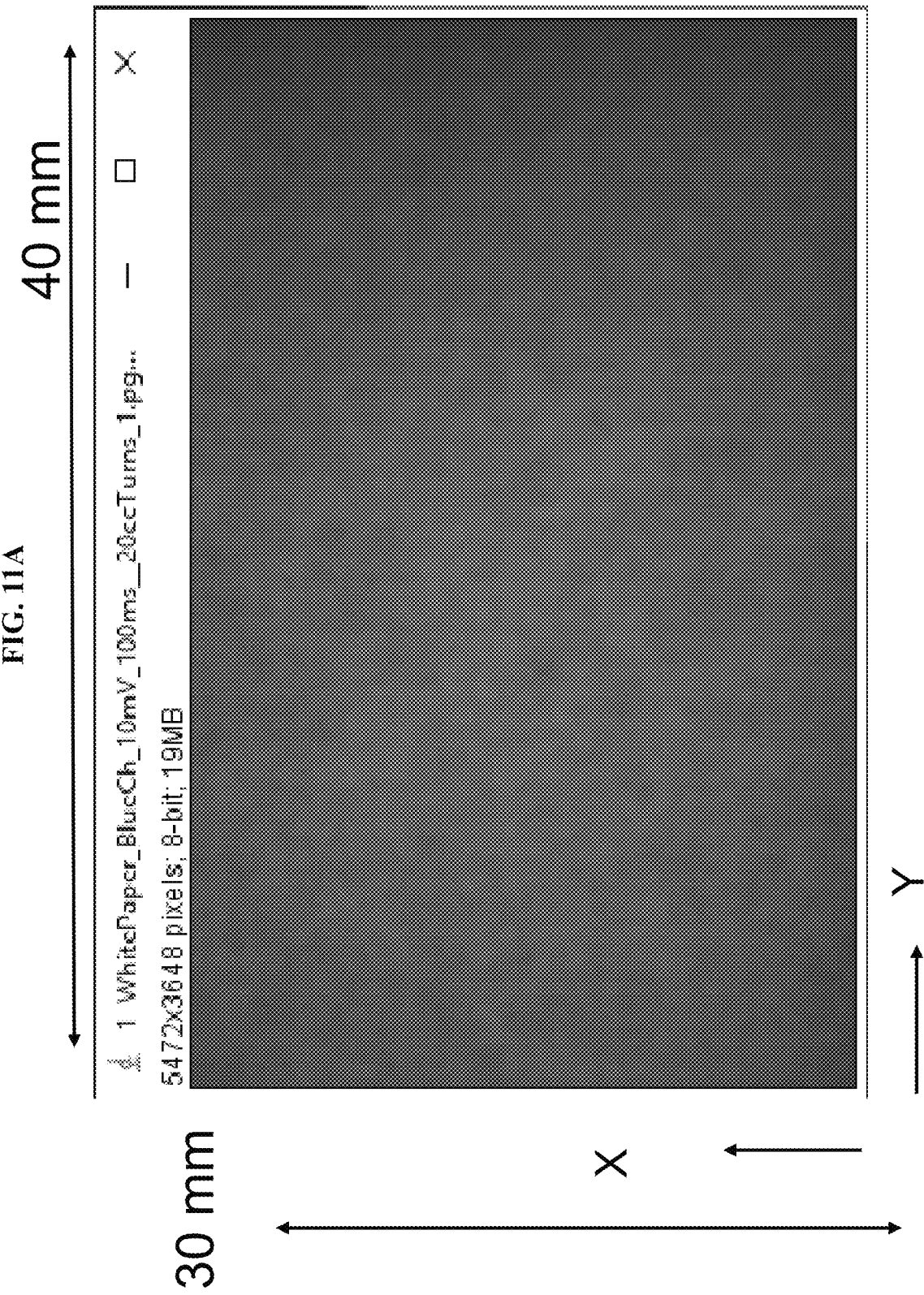
FIG. 11A is an image illustrating the surface two-dimensional (2D) profile of the while paper when the second tilt angle is at 0°.
Figure 11B:
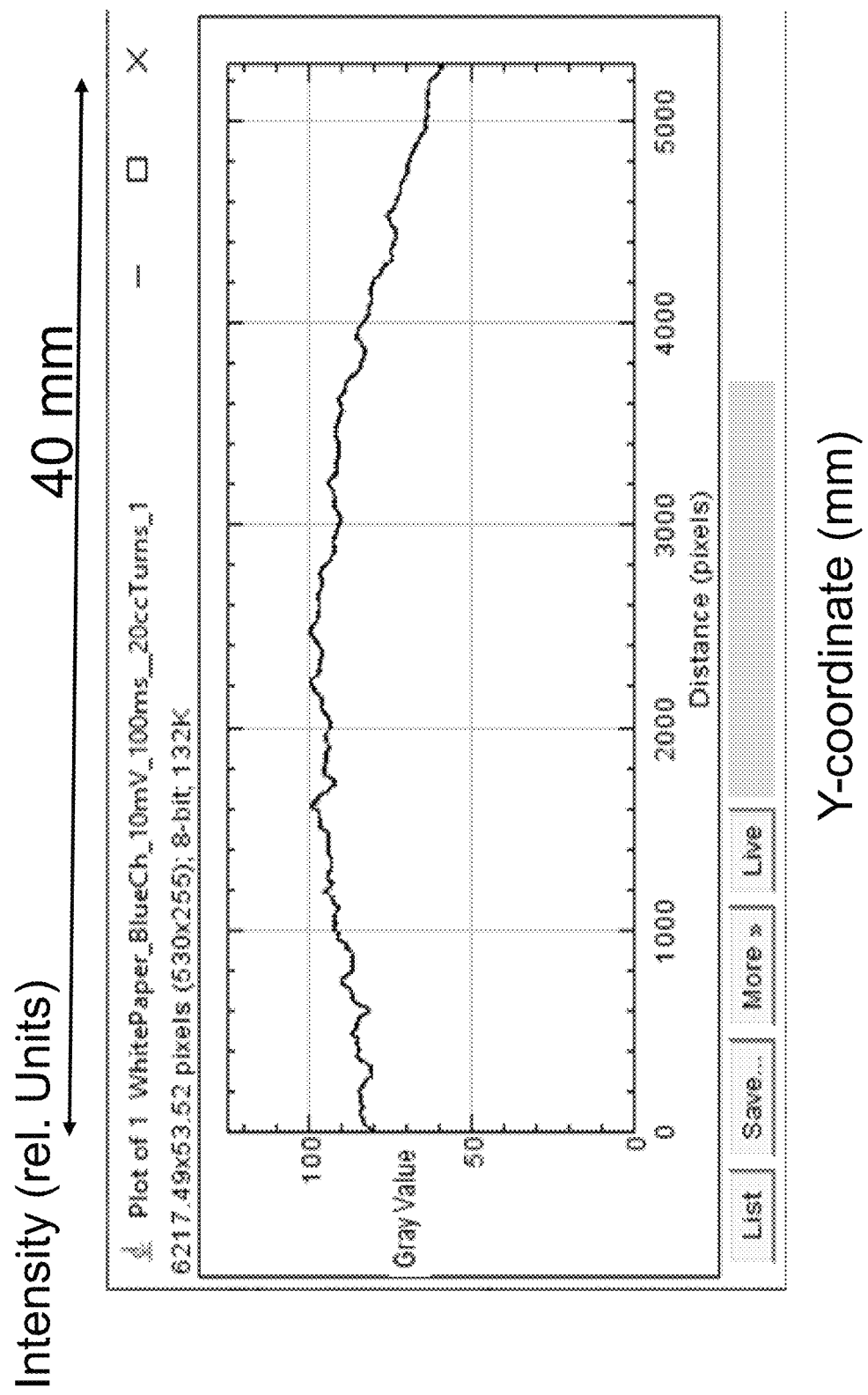
FIG. 11B is a plot of intensity (in relative units or rel. units) as a function of the y-coordinates (in millimeters or mm) showing the y-dimensional profile of the white paper when the second tilt angle is at 0°.

FIG. 11A is an image illustrating the surface two-dimensional (2D) profile of the while paper when the second tilt angle is at 0°. FIG. 11B is a plot of intensity (in relative units or rel. units) as a function of the y-coordinates (in millimeters or mm) showing the y-dimensional profile of the white paper when the second tilt angle is at 0°. FIGS. 11A-B show asymmetrical illumination distribution. As shown, there is a drop-off in brightness towards the right-edge of the sample plane.

Figure 12A:
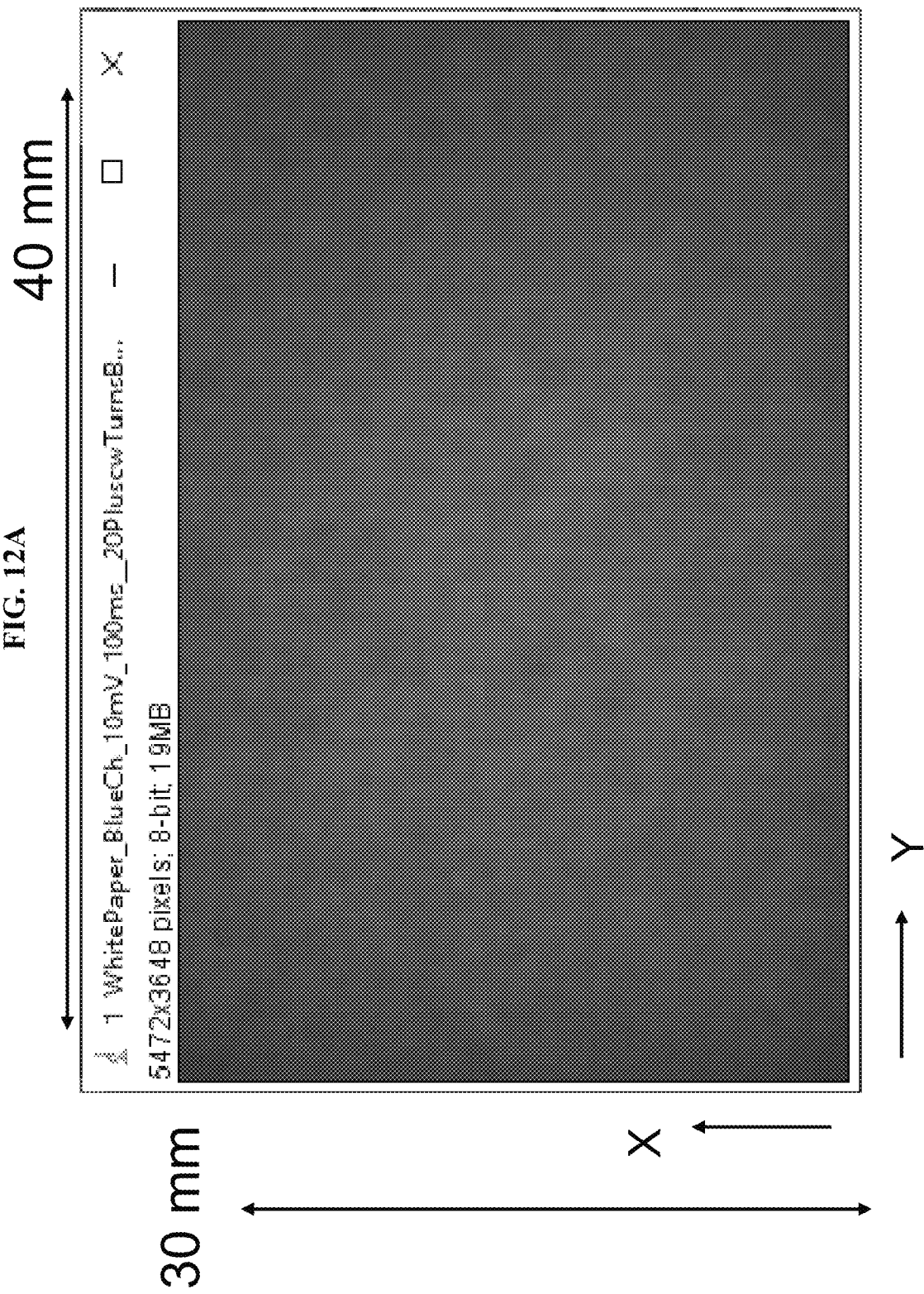
FIG. 12A is an image illustrating the surface two-dimensional (2D) profile of the while paper when the second tilt angle is at 2.7°.
Figure 12B:
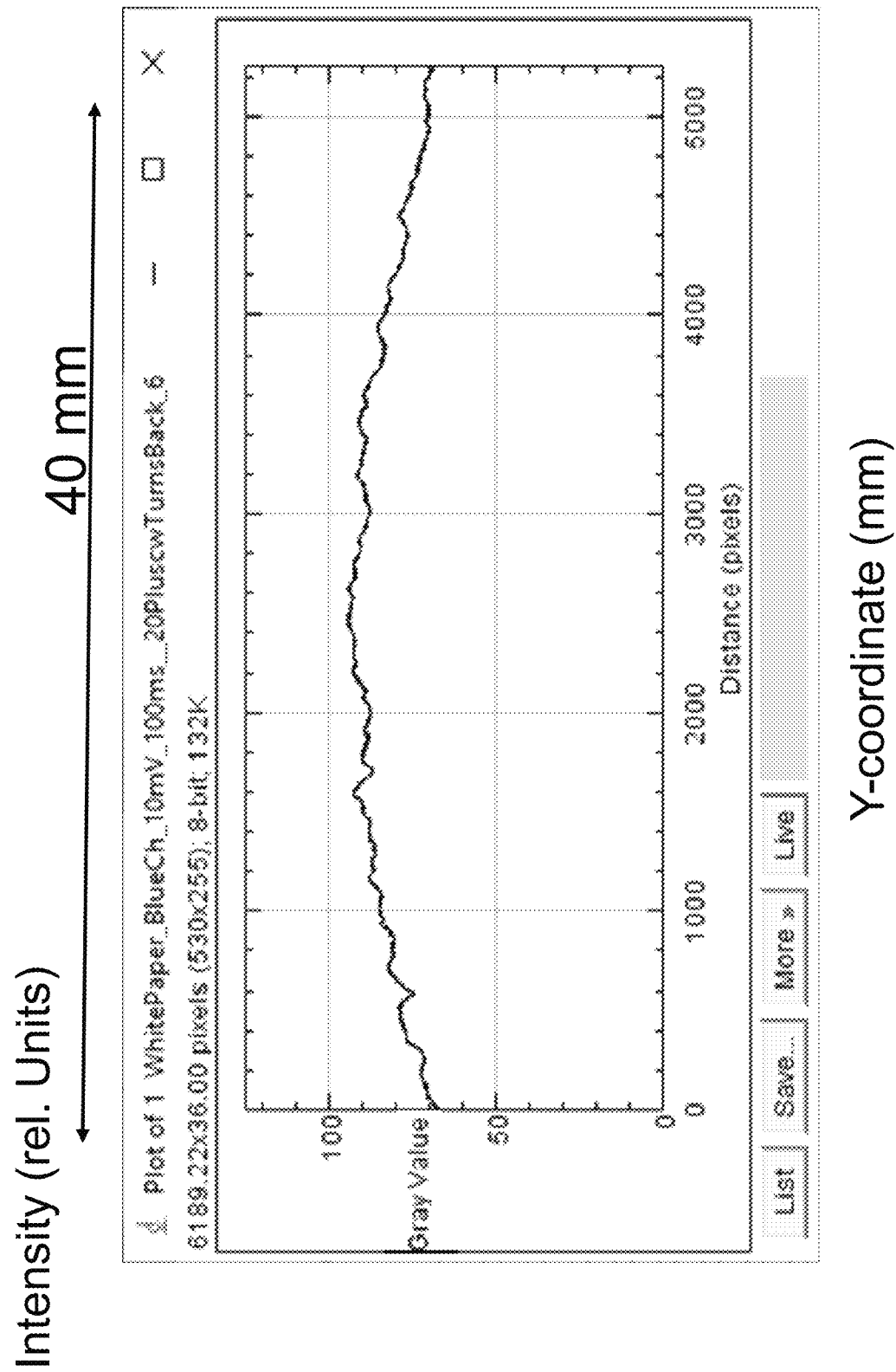
FIG. 12B is a plot of intensity (in relative units or rel. units) as a function of the y-coordinates (in millimeters or mm) showing the y-dimensional profile of the white paper when the second tilt angle is at 2.7°.

FIG. 12A is an image illustrating the surface two-dimensional (2D) profile of the while paper when the second tilt angle is at 2.7°. FIG. 12B is a plot of intensity (in relative units or rel. units) as a function of the y-coordinates (in millimeters or mm) showing the y-dimensional profile of the white paper when the second tilt angle is at 2.7°. FIGS. 12A-B show a more symmetrical illumination distribution compared to FIGS. 11A-B.

The intensity distribution observed in the image shown in FIGS. 12A-B may not be as uniform as the simulation shown in FIGS. 9A-B. Both left and right edges of the actual images are darker than what the simulation shows. The reason is because the imaging lens and the image sensor (i.e., the CMOS sensor) may also contribute to non-uniformity. The imaging lens (from the supplier Edmund Optics, part no. 86-574) may have optical non-uniformity where the edge drops down to between 80%-90% of the peak intensity. The CMOS sensor may also have some level of non-uniformity. Together, these contribute to the total non-uniformity shown in the image. However, it can be seen that the second tilt angle may eliminate or reduce the asymmetry in non-uniformity distribution when using oblique incidence for illumination.

Figure 13A:
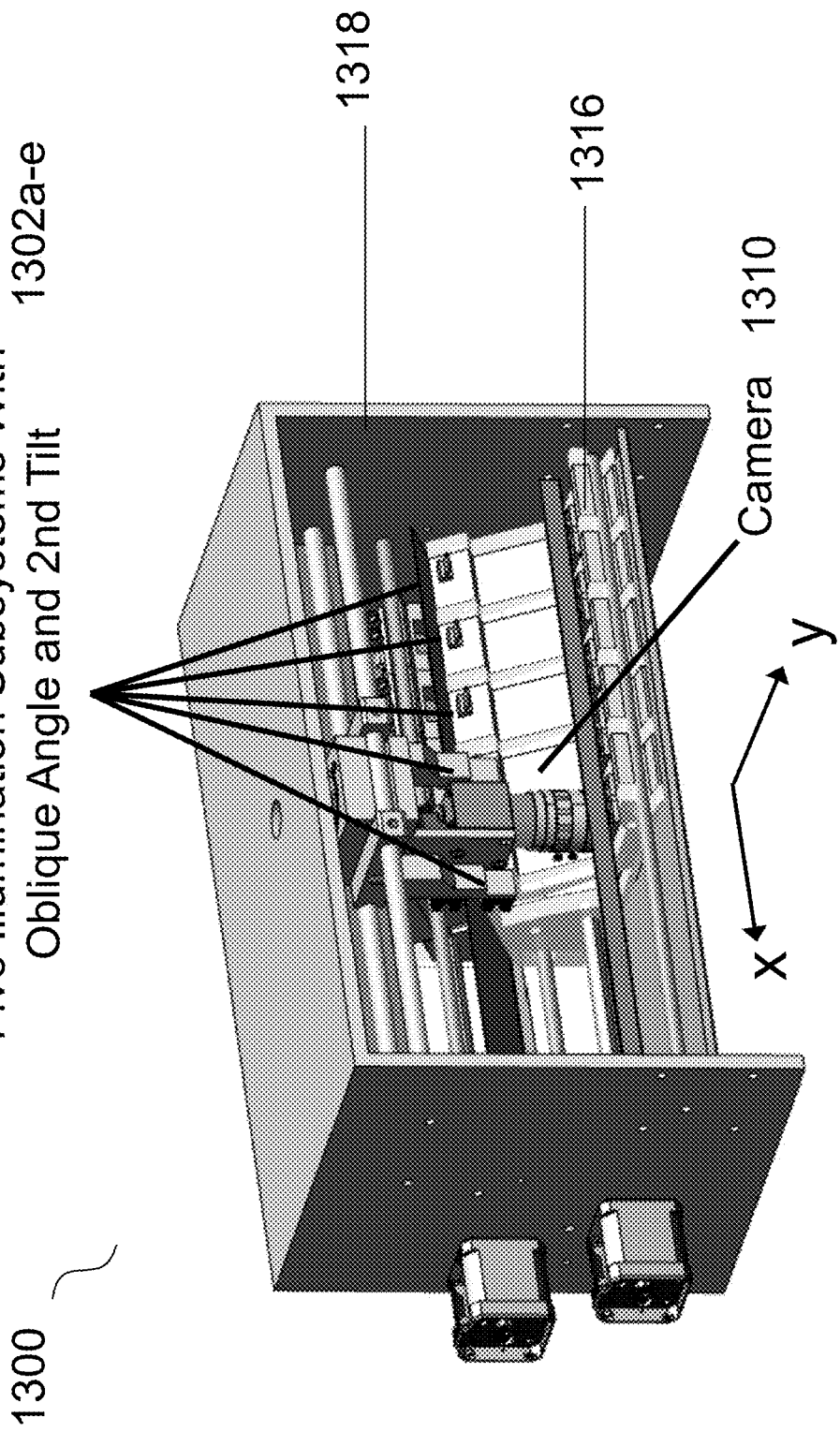
FIG. 13A shows a schematic of a biological entity detection system or instrument according to various embodiments.
Figure 13B:
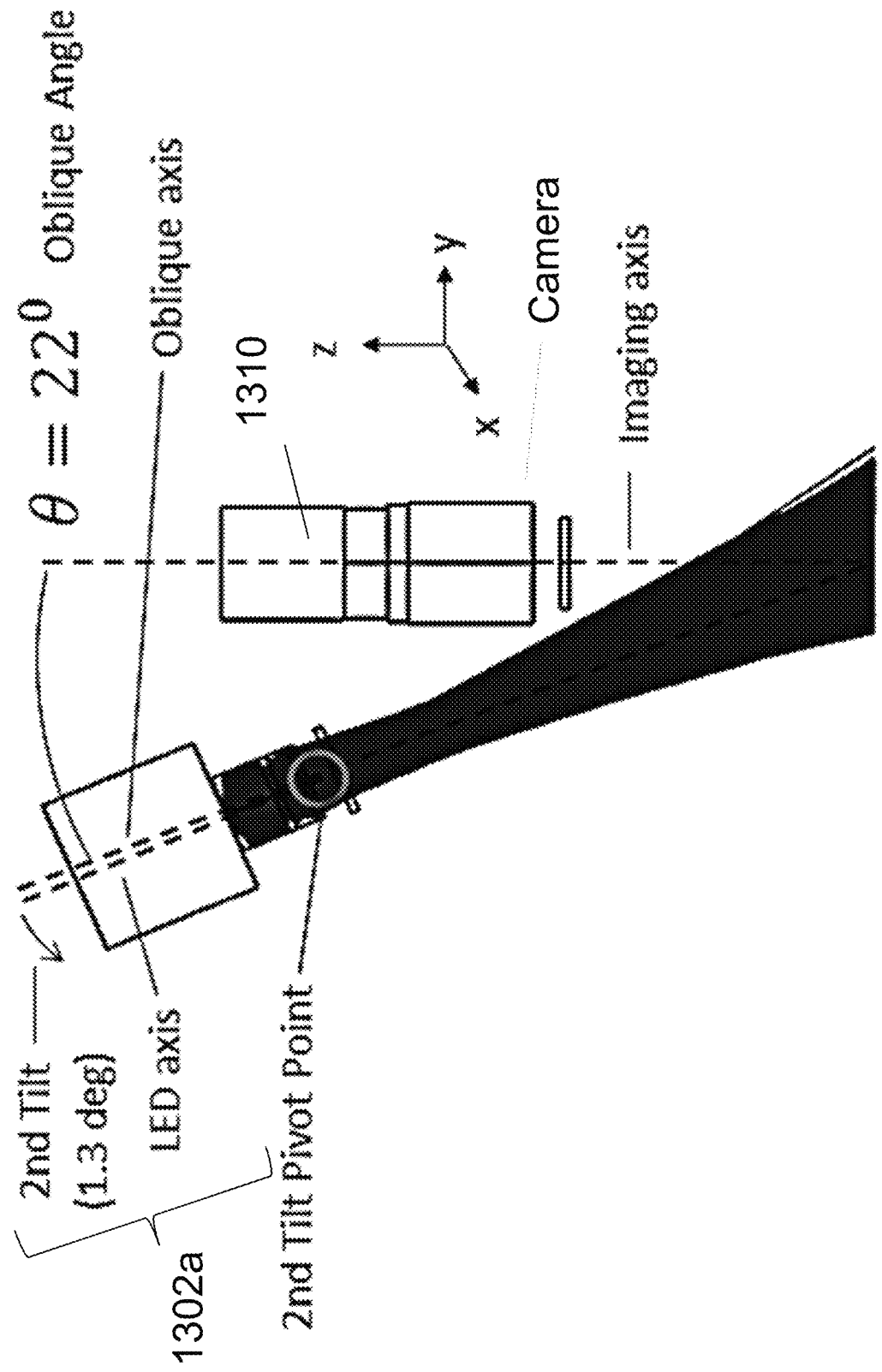
FIG. 13B is a schematic of the optical system and the camera as shown in FIG. 13A according to various embodiments.

FIG. 13A shows a schematic of a biological entity detection system or instrument 1300 according to various embodiments. The system 1300 may include one or more illumination subsystems as described herein. FIG. 13A shows that the system 1300 may include 5 illumination subsystems 1302a-e. The system 1300 may be configured to detect a biological sample containing biological entities such as DNA. The system may include an array of reaction chambers 1316 configured to hold the biological samples. In various embodiments, the system may include one or more microfluidic channels configured to carry biological entities to the array of reaction chambers 1316. The system may also include one or more microfluidic channels configured to carry fluorescence dye to the array of reaction chambers 1316. The illumination subsystems 1302a-e and the array of reaction chamber 1316 may be mounted within a housing 1318. The array of reaction chamber 1316 may form the sample plane. The system 1300 may also include a camera 1310 configured to capture or detect the fluorescence emitted by the biological sample upon illumination by one or more of the illumination subsystems 1302a-e onto the array of reaction chambers 1316. The camera lens 1310 and other components such as filter may also be mounted within the housing 1318. FIG. 13B is a schematic of the optical system 1302a and the camera 1310 as shown in FIG. 13A according to various embodiments.

The second tilt may be set at about 1.3 degrees, and the oblique angle may be set at about 22 degrees for each of the illumination subsystems 1302a-e. Also, there are three different colored LEDs (Blue, Green, and Red) included in the subsystems 1302a-e. Accordingly, one illumination subsystem may provide illumination having a wavelength different from the wavelength of illumination of another illumination subsystem. The LEDs may scan side-ways (i.e. move in a manner parallel and over the sample plane). The LEDs may scan relative to the fixed LED lenses (i.e. the lenses between the LEDs and the sample plane) that project illumination at oblique incidence to the sample plane. While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A method of illuminating a sample plane, the method comprising:
generating an adjusted illumination distribution on the sample plane by adjusting an illumination subsystem from a first tilt position to a second tilt position, the illumination subsystem being adjusted about a pivot point between an optical light source of the illumination subsystem and the sample plane along a first optic axis of the illumination subsystem,
the first optic axis being at an incident angle greater than 0° and less than 90° to a normal of the sample plane, and
the illumination subsystem having a second optic axis when the illumination subsystem is in the second tilt position;
wherein intensity distribution of the adjusted illumination distribution is more symmetrical than that of a reference illumination distribution generated by the illumination subsystem when the illumination subsystem is in the first tilt position.

2. The method of claim 1, wherein the adjusting of the illumination subsystem about the pivot point between the optical light source and the sample plane along the first optic axis includes tilting or rotating the illumination system to the second tilt position.

3. The method of claim 1, wherein the tilting or rotating of the illumination system includes tilting or rotating the illumination system about 1.3° to about 2.7° about the pivot point.

4. The method of claim 1, further comprising aligning the optical light source and at least one lens of the illumination subsystem along the second optic axis after the adjusting of the illumination subsystem about the pivot point.

5. The method according to claim 1, wherein intensity of the adjusted illumination distribution is highest at a center of the adjusted illumination distribution.

6. The method according to claim 1, wherein an angle at which the illumination subsystem is adjusted depends on at least one of the incident angle, the optical light source, the at least one lens, a position of the pivot point along the first optic axis, a distance between the optical light source and the at least one lens, and a distance between the optical light source and the sample plane.

7. The method according to claim 1, wherein the sample plane is formed of an array of reaction chambers each configured to hold a biological sample for detection of a target biological entity in the biological sample.

8. The method according to claim 7, wherein each reaction chamber of the array of reaction chambers is configured to contain dye that fluoresces upon illumination by the illumination subsystem.

9. The method according to claim 1, wherein the optical light source is configured to generate visible light, infrared light, or ultraviolet light.

10. A method of illuminating a sample plane, the method comprising:
generating a reference illumination distribution having a non-uniform intensity distribution on the sample plane by using an illumination subsystem at a first tilt position, the illumination subsystem including an optical light source and at least one lens, the illumination subsystem at a first tilt position having a first optic axis at an incident angle measured relative to a surface normal of the sample plane;
adjusting the illumination subsystem about a pivot point between the optical light source and the sample plane along the first optic axis to a second tilt position having a second optic axis to generate an adjusted illumination distribution having a uniform intensity distribution; and
measuring the adjusted illumination distribution positioned at the second optic axis.

11. The method of claim 10, wherein the measuring the adjusted illumination distribution positioned at the second optic axis includes imaging a drop-off in brightness.

12. The method of claim 11, wherein the drop-off in brightness is towards an edge of the sample plane.

13. The method of claim 10, wherein the adjusting the illumination subsystem about a pivot point includes shifting the illumination subsystem along a direction parallel to the sample plane to improve symmetry of intensity distribution of the illumination subsystem.

14. The method of claim 10, wherein the illumination subsystem includes a plurality of optical light sources and a plurality of lens, the plurality of optical light sources including the optical light source, and the plurality of lens including the at least one lens, and
the generating the reference illumination distribution and the adjusted illumination distribution includes projecting light from the plurality of light sources through the plurality of lens.

15. An optical system, comprising:
an illumination subsystem including at least one optical light source and at least one lens, the illumination subsystem being at a first tilt position and having a first optic axis at an incident angle greater than 0° and less than 90° to a normal of a sample plane,
wherein the illumination subsystem is configured to generate a reference illumination distribution when the illumination subsystem is at the first tilt position, and
wherein the illumination subsystem is adjustable about a pivot point between the at least one optical light source and the sample plane along the first optic axis to generate an adjusted illumination distribution at the sample plane where the illumination subsystem is at a second tilt position and has a second optic axis,
wherein the adjusted illumination distribution generated by the illumination subsystem at the second tilt position is more symmetrical that the reference illumination distribution generated by the illumination subsystem when the illumination subsystem is in the first tilt position.

16. The optical system of claim 15, wherein the at least one lens includes a plurality of lenses arranged to collect light from the at least one optical light source, and project the light towards the sample plane.

17. The optical system of claim 15, further comprising:
an imaging lens over the sample plane, and
a semiconductor sensor at a focal plane of the imaging lens.

18. The optical system of claim 17, wherein at least one of the imaging lens and the semiconductor sensor contributes to the non-uniformity of the reference illumination distribution.

19. The optical system of claim 15, wherein the at least one optical light source includes a plurality of light sources having different wavelengths.

20. The optical system of claim 19, wherein the different wavelengths correspond to different colors.

\* \* \* \* \*

UNITED STATES PATENT AND TRADEMARK OFFICE
CERTIFICATE OF CORRECTION

| | | |
|---|---|---|
| PATENT NO. | : 12,345,642 B2 | Page 1 of 1 |
| APPLICATION NO. | : 18/160718 | |
| DATED | : July 1, 2025 | |
| INVENTOR(S) | : Ronian Siew, Sheau Yeng Wei and Ju-Sung Hung | |

It is certified that error appears in the above-identified patent and that said Letters Patent is hereby corrected as shown below:

On the Title Page

Item (71) should read:
(71) Applicants: COMBINATI INCORPORATED, Carlsbad, CA (US)

Item (73) should read:
(73) Assignee:
ADVANCED INSTRUMENT PTE. LTD.
Singapore (SG)
COMBINATI INCORPORATED
Carlsbad, CA (US)

Signed and Sealed this
Seventh Day of October, 2025

John A. Squires
*Director of the United States Patent and Trademark Office*